US012707103B2

(12) United States Patent
Liu et al.

(10) Patent No.: US 12,707,103 B2
(45) Date of Patent: Aug. 11, 2026

(54) SYSTEM AND METHOD FOR USING DIGITAL ASSETS OF LIVESTREAMING USERS

(71) Applicant: HYTTO PTE. LTD, Singapore (SG)

(72) Inventors: Dan Liu, Singapore (SG); Jilin Qiu, Singapore (SG); Hui Liao, Guangdong (CN)

(73) Assignee: HYTTO PTE. LTD, Singapore (SG)

( * ) Notice: Subject to any disclaimer, the term of this patent is extended or adjusted under 35 U.S.C. 154(b) by 0 days.

(21) Appl. No.: 19/410,252

(22) Filed: Dec. 5, 2025

(65) Prior Publication Data

US 2026/0089354 A1 Mar. 26, 2026

Related U.S. Application Data

(63) Continuation-in-part of application No. 19/316,655, filed on Sep. 2, 2025, now Pat. No. 12,520,009, which is a continuation-in-part of application No. 19/278,425, filed on Jul. 23, 2025, which is a continuation-in-part of application No. 18/762,120, filed on Jul. 2, 2024, now Pat. No. 12,375,774, and a continuation-in-part of application No. 18/189,172, filed on Mar. 23, 2023, said application No. 18/762,120 is a continuation-in-part of application No. 17/806,078, filed on Jun. 8, 2022, now Pat. No. 12,155,899.

(51) Int. Cl.

| | |
|---|---|
| ***H04N 21/2187*** | (2011.01) |
| ***H04N 21/442*** | (2011.01) |

(52) U.S. Cl.

CPC ... *H04N 21/2187* (2013.01); *H04N 21/44218* (2013.01)

(58) Field of Classification Search

None

See application file for complete search history.

(56) References Cited

U.S. PATENT DOCUMENTS

| | | | | |
|---|---|---|---|---|
| 5,955,692 | A | 9/1999 | Hayashi | |
| 12,375,774 | B2 * | 7/2025 | Liu | H04N 21/2407 |
| 2017/0155939 | A1 | 6/2017 | Prasad | |
| 2025/0047919 | A1 * | 2/2025 | Hsu | H04N 21/2187 |

* cited by examiner

*Primary Examiner* — Junior O Mendoza

(74) *Attorney, Agent, or Firm* — Keefe IP Law, PLLC

(57) ABSTRACT

A method for interaction based on a livestreaming digital asset model is disclosed. The method includes activating a monitored object digital application for a user in response to a user input satisfying a specific activation condition, wherein the monitored object digital application is a user-oriented digital application deployed with the livestreaming digital asset model trained on collected data clusters, and acquiring, via the monitored object digital application, input information associated with the user. The method also includes extracting, via the monitored object digital application, information related to a monitored object from the input information, and determining, via the monitored object digital application, a digital asset associated with the monitored object. The method further includes providing, to the user via the monitored object digital application, interactive information including creator interaction data or audience feedback data associated with the digital asset of the monitored object.

20 Claims, 13 Drawing Sheets

SYSTEM AND METHOD FOR USING DIGITAL ASSETS OF LIVESTREAMING USERS

CROSS REFERENCE TO RELATED APPLICATION

This application claims priority to nonprovisional application Ser. No. 19/316,655, filed Sep. 2, 2025, the entire disclosure of which is incorporated herein by reference.

FIELD OF THE INVENTION

The present disclosure generally relates to a system and method for using digital assets, and more particularly to a system and method for using digital assets of livestreaming users.

BACKGROUND OF THE INVENTION

Content creators such as pornographic models, often engage in livestreaming erotic videos to viewers as a safe and lucrative way to engage in erotic work. Such livestreaming typically involves significant amounts of dynamically changing data regarding various aspects of the livestreaming and viewer actions in response to the livestreaming. For example, livestreaming typically involves a large amount of content creator data and content creator live broadcast data being collected, including for example public data.

It is often difficult for content creators to both perform in a live broadcast and also monitor, manage, and act on real-time data associated with that livestream. For example, when content creators are livestream broadcasting, they often cannot pay attention to all of the data generated in a live broadcast room. Content creators often miss valuable information, particularly in pornographic live broadcasts. This is often because content creators are typically performing various actions for viewers and usually cannot pay attention to the dynamic information of a live broadcast, such as audience comments, rewards, and audience entry and exit from the live broadcast.

In addition, content creators may experience overlooked issues and an inability to attend to viewer and system messaging during livestreaming due to actively managing streaming and performing in the live broadcast. Further, content creators may miss out on opportunities to improve their performance based on making use of available livestreaming data associated with previous, successful livestreaming performances.

Accordingly, a need in the art exists for an efficient and convenient technique for content creators engaging in a live broadcast to manage significant amounts of dynamically changing collected data associated with livestreaming broadcasts.

The exemplary disclosed system and method are directed to overcoming one or more of the shortcomings set forth above and/or other deficiencies in existing technology.

SUMMARY OF THE INVENTION

In one exemplary aspect, the present disclosure is directed to a method for interaction based on a livestreaming digital asset model. The method includes activating a monitored object digital application for a user in response to a user input satisfying a specific activation condition, wherein the monitored object digital application is a user-oriented digital application deployed with the livestreaming digital asset model trained on collected data clusters, and acquiring, via the monitored object digital application, input information associated with the user. The method also includes extracting, via the monitored object digital application, information related to a monitored object from the input information, and determining, via the monitored object digital application, a digital asset associated with the monitored object. The method further includes providing, to the user via the monitored object digital application, interactive information including creator interaction data or audience feedback data associated with the digital asset of the monitored object.

In another aspect, the present disclosure is directed to a system. The system includes at least one module comprising computer-executable code stored in non-volatile memory, and a memory for storing instructions and a processor for executing the instructions. The computer-executable code, when operating on the processor, causes the system to: activate a monitored object digital application for a user in response to a user input satisfying a specific activation condition, wherein the monitored object digital application is a user-oriented digital application deployed with a livestreaming digital asset model trained on collected data clusters, and acquire, via the monitored object digital application, input information associated with the user. The computer-executable code, when operating on the processor, also causes the system to: extract, via the monitored object digital application, information related to a monitored object from the input information, determine, via the monitored object digital application, a digital asset associated with the monitored object, and provide, to the user via the monitored object digital application, interactive information including creator interaction data or audience feedback data associated with the digital asset of the monitored object.

DETAILED DESCRIPTION AND INDUSTRIAL APPLICABILITY

Figure 1:
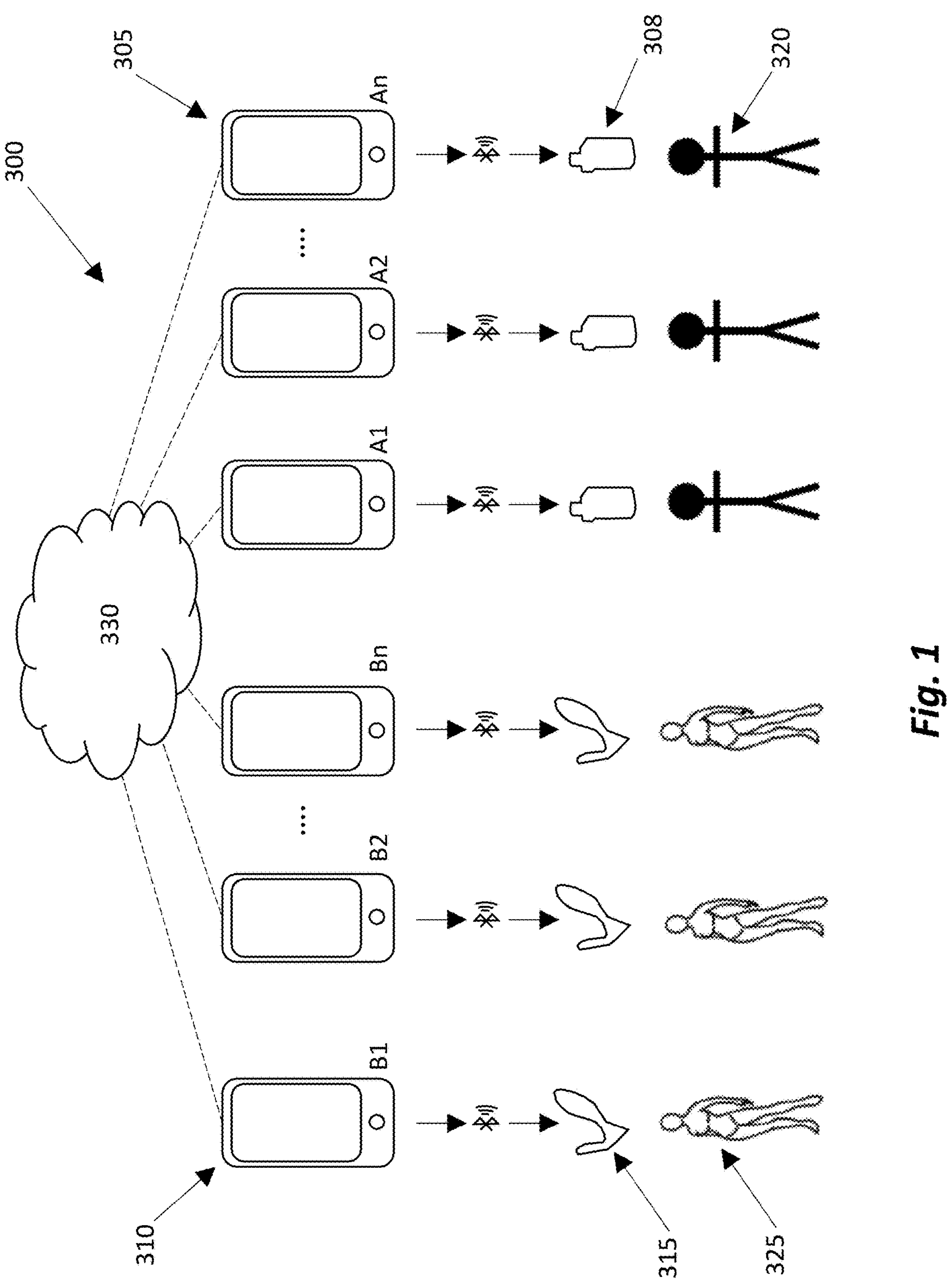
FIG. 1 is a schematic illustration of an exemplary system of the present invention.

FIG. 1 illustrates an exemplary system 300 for providing a live broadcast (e.g., a livestream) including for example controlling devices such as adult devices (e.g., adult toys) as part of the live broadcast. For example, system 300 may include an online platform such as a live broadcast platform. In at least some exemplary embodiments, system 300 may be a system for providing the exemplary disclosed method for using digital assets of livestreaming users. System 300 may use livestream broadcast data (e.g., a relatively large of amount of data) collected by system 300 and/or publicly available data collected during livestreaming to provide and use digital assets of livestreaming users (e.g., anchor users such as content creators, for example performers such as erotic human models) so that new users (e.g., new anchor users such as content creators, for example performers such as erotic human models) may improve their performances based on the digital assets and thereby provide a better experience for content creators (e.g., performers such as erotic human models) and/or audiences.

As illustrated in FIG. 1, system 300 may include one or more male user devices 305, one or more female user devices 310, one or more male accessories 308, and/or one or more female accessories 315. For example, system 300 may include a plurality of male user devices 305, a plurality of male accessories 308, a plurality of female user devices 310, and a plurality of female accessories 315. Data such as image data, audio data, and/or control data may be transferred between male user devices 305, male accessories 308, female user devices 310, and female accessories 315.

Returning to FIG. 1, system 300 may include any desired number of male user devices 305 (e.g., A1, A2, . . . An). Male user device 305 may be any suitable device for interfacing with other components of system 300 such as a computing device (e.g., user interface). For example, male user device 305 may be any suitable user interface for receiving input and/or providing output (e.g., image data) to a male user 320. Male user device 305 may include a camera and a microphone. Male user device 305 may be, for example, a touchscreen device (e.g., of a smartphone, a tablet, a smartboard, and/or any suitable computer device), a wearable device, a computer keyboard and monitor (e.g., desktop or laptop), an audio-based device for entering input and/or receiving output via sound, a tactile-based device for entering input and receiving output based on touch or feel, a dedicated user interface designed to work specifically with other components of system 300, and/or any other suitable user interface (e.g., including components and/or configured to work with components described below regarding FIGS. 12 and 13). For example, male user device 305 may include a touchscreen device of a smartphone or handheld tablet. For example, male user device 305 may include a display (e.g., a computing device display, a touchscreen display, and/or any other suitable type of display) that may provide output, image data, and/or any other desired output or input prompt to a user. For example, the exemplary display may include a graphical user interface to facilitate entry of input by a user and/or receiving output such as image data. An application for example as described herein and/or a web browser may be installed on male user device 305 and utilized by male user 320.

Figure 2:
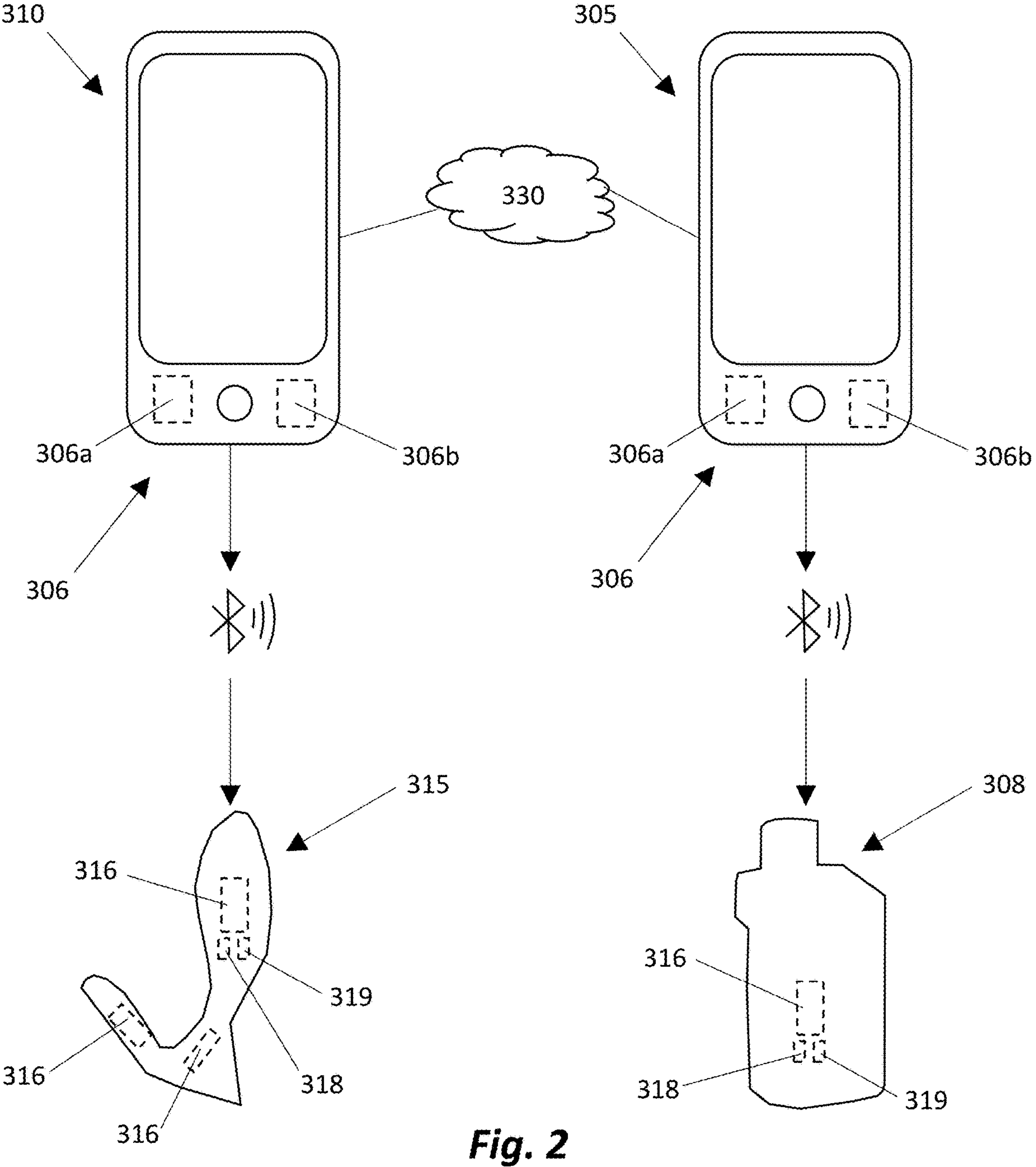
FIG. 2 is schematic illustration of exemplary accessories of the exemplary disclosed system.

As illustrated in FIG. 2, male user device 305 may include a sensor array 306. In at least some exemplary embodiments, sensor array 306 may include one or more sensors integrated or built into the exemplary disclosed user device (e.g., male user device 305) such as, for example, a mobile phone, a pad, or a wearable device. Sensor array 306 may include any suitable sensors for use with system 300 such as, for example, a location sensor 306*a* and a movement sensor 306*b*. Location sensor 306*a* may include a GPS device, a Galileo device, a GLONASS device, an IRNSS device, a BeiDou device, and/or any other suitable device that may operate with a global navigation system.

Movement sensor 306*b* may include any suitable components for sensing motion (e.g., motion amplitude), velocity, and/or acceleration. Movement sensor 306*b* may include an acceleration sensor. Movement sensor 306*b* may include a gyroscope. For example, movement sensor 306*b* may include a displacement sensor, a velocity sensor, and/or an accelerometer. For example, movement sensor 306*b* may include components such as a servo accelerometer, a piezoelectric accelerometer, a potentiometric accelerometer, and/or a strain gauge accelerometer. Movement sensor 306*b* may include a piezoelectric velocity sensor or any other suitable type of velocity or acceleration sensor.

System 300 may include any desired number of female user devices 310 (e.g., B1, B2, . . . Bn). Female user device 310 may be similar to male user device 305. For example, female user device 310 may be any suitable user interface for receiving input and/or providing output (e.g., image data) to a female user 325. Female user 325 may operate female user device 310 to record and transfer image (e.g., video) and audio data to one or more male users 320 and/or other female users 325 via a network 330. Additional exemplary disclosed devices and/or users of any desired gender may also be included in the exemplary disclosed system (e.g., a non-binary user and/or a non-binary user device and/or non-binary accessory similar to the examples described herein).

Female accessory 315 may be any suitable accessory for use by female user 325 (e.g., when female user 325 is imaged by female user device 310). For example, female accessory 315 may be a prop that is used by female user 325 while female user 325 is being imaged (e.g., a video or pictures of female user 325 are being recorded and/or transmitted in real-time to be viewed by male user 320 and/or another female user 325). For example, female accessory 315 may be a device used for erotic stimulation (e.g., a sex aid or a "sex toy"). Female accessory 315 may be a sexual stimulation device that may be associated with a given female user 325 and respective female user device 310 of that given female user 325. In at least some exemplary embodiments, female accessory 315 may be a massaging apparatus for human genitalia (e.g., a vibrator). For example, female accessory 315 may be any suitable device for use in a video or pictures recorded by female user device 310, which may be an erotic video or erotic pictures). In at least some exemplary embodiments, female accessory 315 may be a tool or other indicator that may be used in video or pictures recorded by female user device 310 such as a sign providing information such as location or time information, a surveillance tool used by female user 325, and/or any other suitable tool or accessory that may be used while female user device 310 is recording a video or pictures of female user 325. For example, female user 325 may be an anchor user such as a content creator (e.g., performer such as an erotic human model) using female accessory 315 that may be an erotic device, a technician or laborer using female accessory 315 that may be a tool or work device specific to a desired application, and/or any other desired role using any suitable female accessory 315.

Female accessory 315 may include one or more actuator mechanisms, for example, driving components such as one or more motors 316. Motor 316 may include an electric motor. Motor 316 may include a servomotor, a stepper motor, a brushless motor, or any other suitable type of motor. Motor 316 may include any suitable vibration motor or haptic motor such as, for example, a mini vibrator motor. Motor 316 may include a low voltage motor. Motor 316 may include a pager motor or a coin vibration motor. Motor 316 may include a linear resonant actuator or an eccentric rotating mass vibration motor. Motor 316 may be a reversible electric motor (e.g., a reversible electric motor). Motor 316 may be a unidirectional motor (e.g., a one-way motor). Motor 316 may be powered by any suitable power source, such as a battery (e.g., a nickel-metal hydride battery, a lithium-ion battery, an ultracapacitor battery, a lead-acid battery, and/or a nickel cadmium battery), an electric power source (e.g., a transformer connected to a plug that may plug into an outlet), and/or any other suitable energy source. Female accessory 315 may include a controller 319 that may be any suitable computing device for controlling an operation of motor 316 and a communication device 318. Controller 319 may, for example, include components similar to the components described below regarding FIG. 12. Controller 319 may include for example a processor (e.g., micro-processing logic control device) or board components. Controller 319 may control one or more motors 316 based on input data and/or commands (e.g., control commands) received from male user device 305 and/or female user device 310 via a network 330 and/or communication device 318 (e.g., transferred directly to communication device 318 by any suitable component of system 300). Motor 316 may be controlled by controller 319 to vibrate female accessory 315 at a desired level or strength, perform a suction operation at a desired level or strength using female accessory 315 (e.g., using female accessory 315 as a suction device), rotate or swing female accessory 315 at a desired speed or amount, contract or expand female accessory 315 by a desired amount, cause female accessory 315 to perform an inhalation action, and/or cause female accessory 315 to perform any other suitable action or function.

In at least some exemplary embodiments, the exemplary disclosed actuator mechanism may be or may include a thermal device such as a heater (e.g., or a cooler or any other suitable thermal device). Alternatively for example, a heater unit and the exemplary disclosed motor may be separately provided (e.g., installed) in the exemplary disclosed adult toy. In at least some exemplary embodiments, the exemplary disclosed actuator mechanism may include an electric heating device such as an electric resistance heating device. The exemplary disclosed actuator mechanism may include a polyimide heater, a silicone rubber heater, and/or a resistive wire heater. The exemplary disclosed actuator mechanism may be controlled by controller 319 to heat or emit heat or warmth from female accessory 315. For example, the exemplary disclosed actuator mechanism may cause a temperature variation of female accessory 315.

Returning to FIG. 2, male accessory 308 may include components generally similar to female accessory 315 and may operate generally similarly to female accessory 315. Male accessory 308 may be a sexual stimulation device that may be associated with a given male user 320 (e.g., a viewer of one or more female users 325 and/or male users 320; or an anchor user such as a content creator such as a performer, for example a male model) and respective male user device 305 (e.g., a viewer device) of that given male user 320.

Network 330 may be any suitable communication network over which data may be transferred between one or more male user devices 305, one or more male accessories 308, one or more female user devices 310, and/or one or more female accessories 315. Network 330 may be the internet, a LAN (e.g., via Ethernet LAN), a WAN, a WiFi network, or any other suitable network. Network 330 may be similar to WAN 201 described below. The components of system 300 may also be directly connected (e.g., by wire, cable, USB connection, and/or any other suitable electro-mechanical connection) to each other and/or connected via network 330. For example, components of system 300 may wirelessly transmit data by any suitable technique such as, e.g., wirelessly transmitting data via 4G LTE networks (e.g., or 5G networks) or any other suitable data transmission technique for example via network communication. Components of system 300 may transfer data via the exemplary techniques described below regarding FIG. 13. Male user devices 305, male accessories 308, female user devices 310, and/or female accessories 315 may include any suitable communication components for communicating with other components of system 300 using for example the communication techniques described above. For example, male user devices 305 and female user devices 310 may include integrally formed communication devices (e.g., smartphone components), and male accessories 308 and female accessories 315 may each include communication device 318 that may communicate using any of the exemplary disclosed communication techniques.

In at least some exemplary embodiments, a given female accessory 315 may communicate with a given female user device 310 (e.g., a paired female user device 310) via any suitable short distance communication technique. For example, female accessories 315 (e.g., via communication device 318) and female user devices 310 may communicate via Wifi, Bluetooth, ZigBee, NFC, IrDA, and/or any other suitable short distance technique. Female accessory 315 may be an adult toy that may be connected with female user device 310 through short distance wireless communication. An application (e.g., operating using the exemplary disclosed modules) may be installed on female user device 310, the application and female user device 310 being configured to send commands to female accessory 315 to drive (e.g., actuate) female accessory 315. Male accessory 308 may communicate with male user device 305 similarly to the communication of female accessory 315 and female user device 310 described above.

System 300 may include one or modules for performing the exemplary disclosed operations such as, for example, the exemplary disclosed modules for example as described herein. The one or more modules may include an accessory control module for controlling male accessory 308 and female accessory 315. The one or more modules may be stored and operated by any suitable components of system 300 (e.g., including processor components) such as, for example, network 330, male user device 305, male accessory 308, female user device 310, female accessory 315, and/or any other suitable component of system 300. For example, system 300 may include one or more modules having computer-executable code stored in non-volatile memory. System 300 may also include one or more storages (e.g., buffer storages) that may include components similar to the exemplary disclosed computing device and network components described below regarding FIGS. 12 and 13. For example, the exemplary disclosed buffer storage may include components similar to the exemplary storage medium and RAM described below regarding FIG. 12. The exemplary disclosed buffer storage may be implemented in software and/or a fixed memory location in hardware of system 300. The exemplary disclosed buffer storage (e.g., a data buffer) may store data temporarily during an operation of system 300.

The one or more exemplary disclosed modules may include software modules running on content creator (e.g., performer such as an erotic human model) equipment. The software modules may include a smart panel (e.g., as described below), game plug-ins, and/or toy control plug-ins (e.g., for the exemplary disclosed toys) that may assist anchor users (e.g., content creators such as performers, for example, erotic human models) in live broadcasting.

Figure 3:
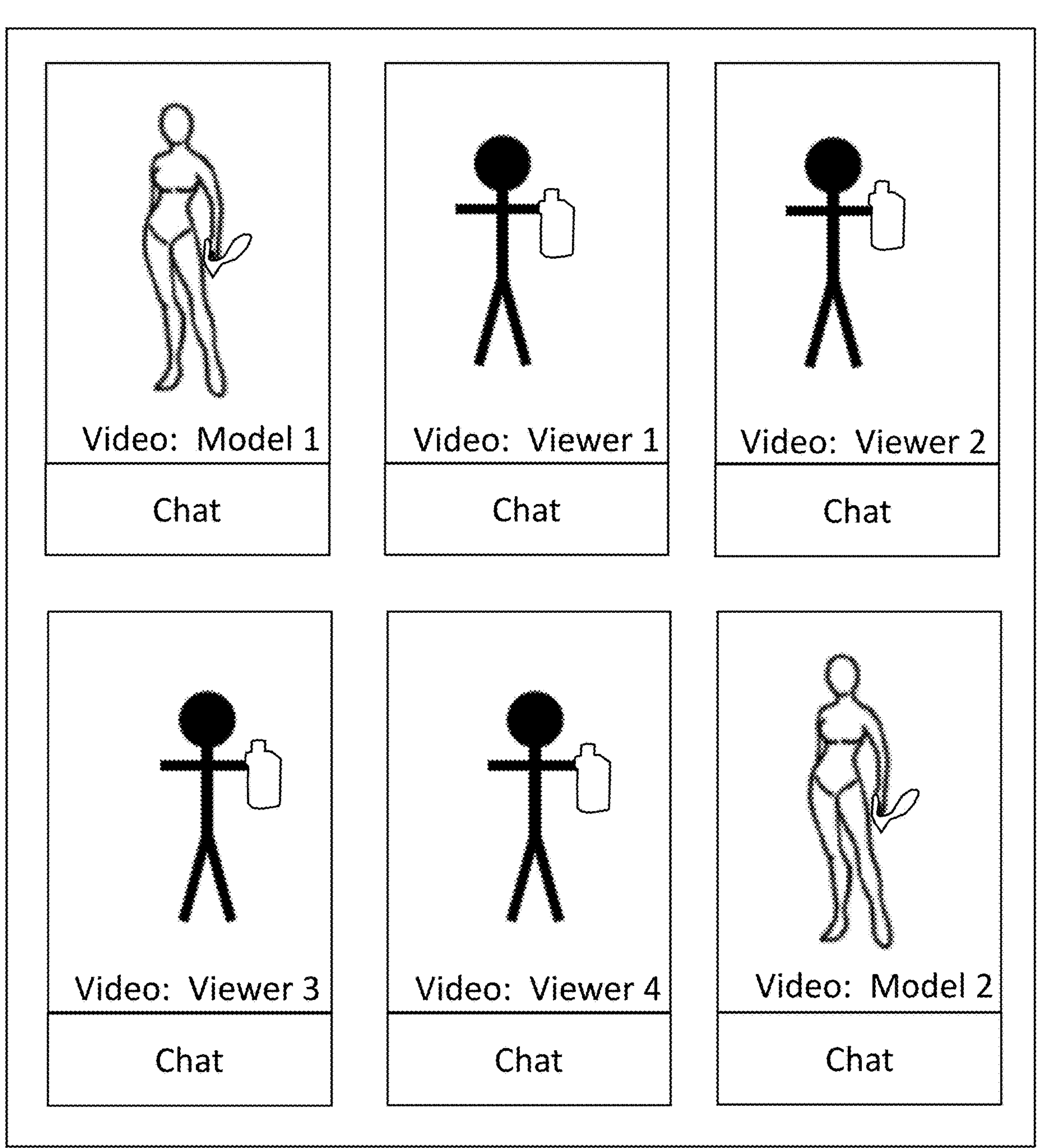
FIG. 3 is a schematic illustration of an exemplary embodiment of the exemplary disclosed system.

The one or more exemplary disclosed modules may also provide a chat room interface via one or more male user devices 305 and/or one or more female user devices 310 for use by male users 320 and female users 325. For example, a video display of female user 325, a video display of one or more male users 320, and/or and a graphical display of a chat or messaging app (e.g., any suitable chat communication or messaging app such as, for example, text, voice, and/or video chat boxes) may be displayed to each male user 320 via male user device 305 and to each female user 325 via female user device 310. One or more male users 320 and one or more female users 325 may thereby view and chat (e.g., text, voice, and/or video chat) with each other via the one or more exemplary disclosed modules via respective male user devices 305 and female user devices 310. Male users 320 and female users 325 may thereby view, interact with, and/or chat (e.g., text, voice, and/or video chat) with other female users 325 and/or other male users 320 (e.g., and/or any other users of an gender such as non-binary users as described above or any other gender). For example, multiple text, voice, and/or video chat boxes including a plurality of male users 320 (e.g., viewers or anchor users such as content creators, for example, performers such as erotic human models, each having one or more male accessories 308) and/or a plurality of female users 325 (e.g., viewers or anchor users such as content creators, for example, performers such as erotic human models, each having one or more female accessories 315) may be displayed to each male user 320 and each female user 325 via respective male user devices 305 and female user devices 310. Male users 320 and female users 325 may thereby view and interact with other male users 320 and female users 325 that may each have one or more respective accessories (e.g., respective male accessories 308 and female accessories 315). FIG. 3 schematically illustrates an exemplary embodiment of the exemplary disclosed chat room that may be displayed to male user 320 via male user device 305 and/or to female user 325 via female user device 310.

Figure 4:
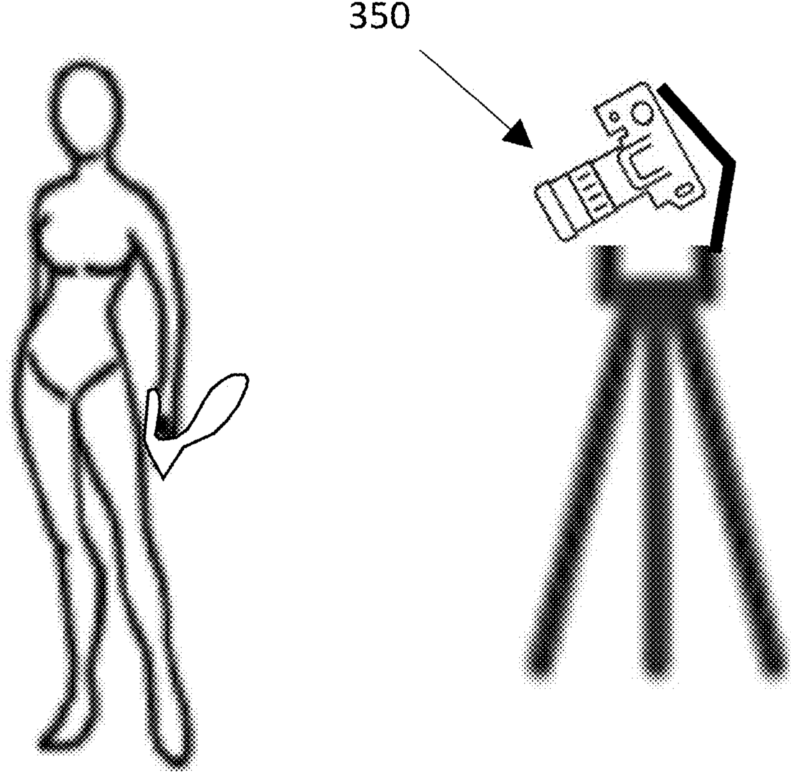
FIG. 4 is a schematic illustration of an exemplary embodiment of the exemplary disclosed system.

In at least some exemplary embodiments and as illustrated in FIG. 4, system 300 may further include an imaging device 350. Imaging device 350 may be used directly and/or indirectly to provide data to be used in an operation of system 300. For example, imaging device 350 may be a camera that may be used to obtain user input (e.g., data of gesturing images made by the user) by any suitable imaging technique (e.g., for example as described herein).

Imaging device 350 may be any suitable imaging device such as a camera. For example, imaging device 350 may be any suitable video camera such as a digital video camera, a webcam, and/or any other suitable camera for recording visual data (e.g., recording a video or taking pictures) and/or image recognition. Imaging device 350 may be a 3D camera. Imaging device 350 may be a headset that may be worn by a user (e.g., male user 320 or female user 325). Imaging device 350 may be a spatial computing device (e.g., a spatial computer). Imaging device 350 may utilize any suitable spatial computing features and/or techniques (e.g., similar to Apple Vision Pro). Imaging device 350 may be for example a three-dimensional video sensor or camera. One or more imaging devices 350 may include a plurality of cameras or a single camera configured to collect three-dimensional image data. In at least some exemplary embodiments, imaging device 350 may be a stereoscopic camera and/or any other suitable device for stereo photography, stereo videography, and/or stereoscopic vision. Imaging device 350 may be substantially entirely integrated into the exemplary disclosed user devices or may be a stand-alone device. In at least some exemplary embodiments, imaging device 350 may be a smartphone or tablet camera. Imaging device 350 may provide data to an exemplary image recognition module of system 300. Imaging device 350 may include one or more actuators that may adjust a position of imaging device 350 based on an operation of system 300 (imaging device 350 may also include a support or stand for supporting imaging device 350). The actuators may be for example one or more external actuators disposed at an exterior of imaging device 350 and/or one or more integrated actuators that are completely or partially integrated into imaging device 350 (e.g., disposed and/or integrated within an interior of imaging device 350). In at least some exemplary embodiments, the actuators may be internally integrated into imaging device 350 and may turn optical components and/or move lenses of imaging device 350 within a housing of imaging device 350 to zoom in and out at different features or points within a variable field of view of imaging device 350 (e.g., zoom in and out on points or features of a user and/or exemplary disclosed accessories). The actuator may also be one or more external and/or internally-integrated mechanical actuators configured to mechanically turn imaging device 350 and move lenses of imaging device 350 to focus in and out at desired objects (e.g., points and/or features of a user and/or an accessory). System 300 may also include an image recognition module that may perform feature detection and matching to allow for matching and comparison of features imaged by imaging device 350. For example, imaging device 350 may find predetermined features that may correspond to two-dimensional and/or three-dimensional surfaces and/or contours of an object within a field of view of imaging device 350. Also for example, any suitable technique may be used to identify features (e.g., spatial data) of a viewed object (e.g., features of a user and/or accessory) and to match those imaged features to predetermined features provided by system 300 (e.g., or provided by a user). Also for example, optical character recognition of text and/or markings located on a viewed object may be performed. For example, spatial data and/or other data may be determined that may be matched to predetermined data provided by system 300 (e.g., predetermined shapes, colors, text, contours, and other features). For example, the spatial data and/or other data may include data defining points (e.g., or contours) of a user and/or accessory based on an actual image of an object (e.g., the exemplary disclosed accessories) imaged by imaging device 350. For example, spatial and/or data based on viewing an object may be used to match that data to predetermined data to identify points or features of an object being viewed. Any suitable techniques for recognizing objects and/or determining spatial and/or other data of a viewed object may be utilized by system 300 for image recognition via imaging device 350.

The exemplary disclosed system and method may be used in any suitable application for a live broadcast. The exemplary disclosed system and method may be used in any suitable application involving a content creator (e.g., performer such as an erotic human model) livestreaming a video to an audience. For example, the exemplary disclosed system and method may be used in any suitable application for providing a livestream erotic broadcast. The exemplary disclosed system and method may be used in any suitable application involving the use of artificial intelligence (AI) in livestreaming. The exemplary disclosed system and method may be used in any suitable application involving using and analyzing previously collected livestreaming data.

Figure 5:
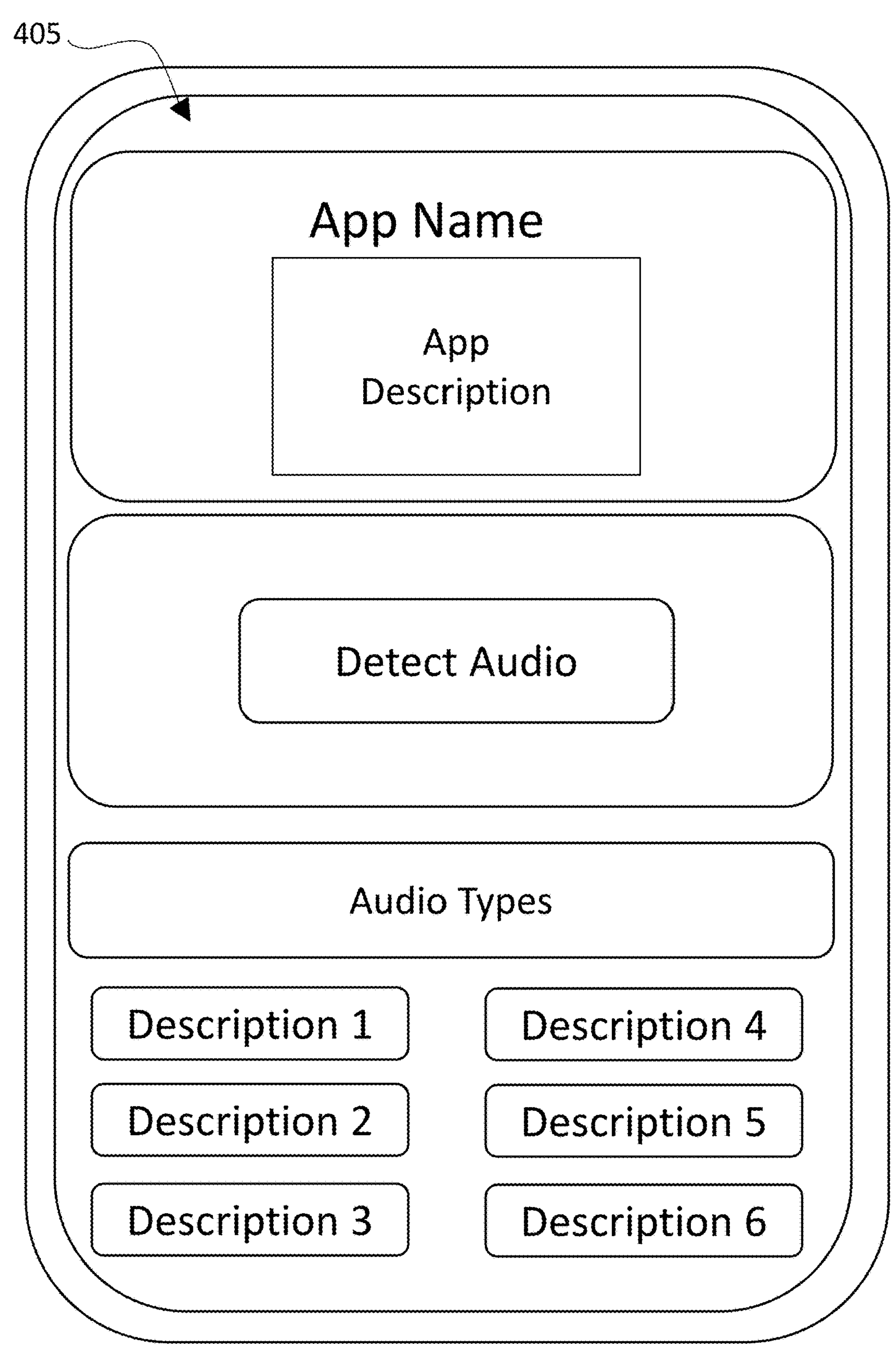
FIG. 5 is a schematic illustration of an exemplary embodiment of the exemplary disclosed system.

In at least some exemplary embodiments and for example as illustrated in FIG. 5, graphical elements provided by system 300 may be displayed on a graphical user interface such as a GUI 405 on a display or touchscreen of the exemplary disclosed user device (e.g., male user device 305, female user device 310, and/or any other suitable user device) to the user (e.g., or a spatial computing interface such as for example similar to Apple Vision Pro). Any suitable graphical element (e.g., text, graphics, GIFs, video, and/or any other suitable graphics) may be displayed on GUI 405. GUI 405 may display the exemplary disclosed live broadcast and/or data and/or elements associated with the live broadcast (e.g., input data, output data, control elements, graphical elements, information, and/or any other suitable data and/or objects) to one or more viewers and/or anchor users such as content creators (e.g., one or more female users 325 and/or male users 320) via one or more exemplary disclosed user devices (e.g., one or more female user devices 310 and/or one or more male user devices 305, and/or any other suitable device).

In at least some exemplary embodiments, the exemplary disclosed system and method may include a monitored object digital application. A service provider (e.g., a provider or operator of a platform of system 300) may provide a service or function for use by the exemplary disclosed users. For example, the service provider (e.g., the provider or operator of a platform of system 300) may host a website, application, or similar platform for use by the exemplary disclosed users. The monitored object digital application may operate as described below using the exemplary disclosed modules and/or artificial intelligence operations described herein.

In at least some exemplary embodiments, the exemplary disclosed service provider may activate the exemplary disclosed monitored object digital application for a given user in response to user input of the user (e.g., provided by the user) satisfying a specific activation condition. The user input satisfying the exemplary disclosed specific activation condition may be for example a user logging into an account on the exemplary disclosed platform operating using system 300. For example, when a user logs in to an account, this action may be (e.g., may be considered) user input satisfying the exemplary disclosed specific activation condition. The user input satisfying the exemplary disclosed specific activation condition may also be for example a user's login account meeting a predetermined (e.g., preset) level. For example, when the user's login account level meets a preset requirement, this action may be (e.g., may be considered) user input satisfying the exemplary disclosed specific activation condition. For example, the user's account level may be a premium level or other relatively higher or more exclusive type or category of membership to the exemplary disclosed service provider. The user input satisfying the exemplary disclosed specific activation condition may further be for example a free use status provided to all users. For example, if the exemplary disclosed service provider provides a free use status (e.g., free use qualification) to substantially all users, this action may be (e.g., may be considered) user input satisfying the exemplary disclosed specific activation condition. The user input satisfying the exemplary disclosed specific activation condition may also be for example a user (e.g., a given user) obtaining free use status (e.g., free use qualification). For example, if the given user obtains (e.g., or given users obtain) free use qualifications, this action may be (e.g., may be considered) user input satisfying the exemplary disclosed specific activation condition. The user input satisfying the exemplary disclosed specific activation condition may further be for example a given user providing payment. For example, if a given user (e.g., or plurality of users) completes a payment such as a subscription or other payment type, this action may be (e.g., may be considered) user input satisfying the exemplary disclosed specific activation condition.

In at least some exemplary embodiments, the exemplary disclosed monitored object digital application may be any suitable user-oriented digital application. The exemplary disclosed monitored object digital application may be used (e.g., deployed) with a livestreaming digital asset model that may be trained on (e.g., previously trained using) collected data clusters. The exemplary disclosed collected data clusters may include personal profile data of one or more anchor users such as one or more experienced content creators (e.g., performers such as erotic human models), interaction data of the livestreaming room of the one or more experienced content creators, profile data of followers of the one or more experienced content creators, interaction data of followers in the livestreaming room or rooms of the one or more experienced content creators, and/or similar data. For example, the exemplary disclosed personal profile data may include data provided on a bio or summary page of the one or more experienced content creators provided by the exemplary disclosed monitored object digital application. Also for example, the exemplary disclosed interaction data of the livestreaming room may include livestreaming data created by the one or more experienced content creators in their respective livestreaming rooms provided by the exemplary disclosed monitored object digital application. Further for example, the exemplary disclosed profile data of followers of the one or more experienced content creators (e.g., performers such as erotic human models) may include data provided on a bio or summary page of one or more followers of the one or more experienced content creators provided by the exemplary disclosed monitored object digital application. Also for example, the exemplary disclosed interaction data of followers in the livestreaming room or rooms of the one or more experienced content creators may include comments (e.g., text and graphical comments), actions (e.g., recorded audio and/or video), and/or other information associated with an interaction of followers in the livestreaming room or rooms of the one or more experienced content creators. The exemplary disclosed livestreaming digital asset model may be obtained based on training the livestreaming digital asset model on the exemplary disclosed collected data clusters of the one or more experienced content creators (e.g., performer such as an erotic human model). For example, the exemplary disclosed monitored object digital application may be trained using any suitable livestream broadcast data including data collected during an operation of system 300 and/or publicly available livestreaming data. The exemplary disclosed monitored object digital application (e.g., user-oriented digital applications) may be applied in a variety of scenarios. The monitored object digital application that may be a user-oriented digital application may include an audience digital application for audience end-users, a creator digital application for creator end-users, and/or a general digital application for general end-users. For example, the exemplary disclosed monitored object digital application (e.g., user-oriented digital application) may be a digital application for use by audience users (e.g., viewer users watching livestream broadcast). Also for example, the exemplary disclosed monitored object digital application (e.g., user-oriented digital application) may be a digital application for use by anchor users such as content creators (e.g., new anchor users, junior anchor users, and/or relatively inexperienced anchor users). Further for example, the exemplary disclosed monitored object digital application (e.g., user-oriented digital application) may be a digital application for use by ordinary users (e.g., end users such as viewers).

In at least some exemplary embodiments, the exemplary disclosed monitored object digital application may provide interactive information, which may comprise creator interaction data and/or audience feedback data, to the user. The exemplary disclosed interactive information (e.g., creator interaction data and/or audience feedback data) may be associated with the exemplary disclosed digital asset or digital assets of the exemplary disclosed monitored object (e.g., or monitored objects).

In at least some exemplary embodiments, the exemplary disclosed monitored object digital application may first acquire (e.g., obtain or receive) input information associated with a given user. The exemplary disclosed monitored object digital application may then extract information related to a monitored object from the input information (e.g., provided by the user), and determine a digital asset associated with the exemplary disclosed monitored object. The exemplary disclosed monitored object digital application may then (e.g., may finally) provide the exemplary disclosed interactive information to the user.

In at least some exemplary embodiments, the exemplary disclosed input information may be associated with the user (e.g., may be perceptible information associated with the user). For example, the exemplary disclosed input information may be manually input by the user and/or automatically obtained by the exemplary disclosed monitored object digital application. For example, the exemplary disclosed monitored object digital application may determine that the anchor (e.g., a user associated with the input information) has a certain ID (e.g., identification number), a certain nationality or race (e.g., race and/or ethnicity), and/or any other perceptible characteristics of the anchor (e.g., user associated with the input information). The exemplary disclosed input information associated with the anchor (e.g., a user associated with the input information) may be information captured actively or passively by the exemplary disclosed monitored object digital application such as, for example, events in the live broadcast room of the anchor (e.g., sponsors entering the live broadcast room, audience user behavior data after the audience users enter the live broadcast room, and/or any other suitable events or activities in the live broadcast room).

In at least some exemplary embodiments, information related to the exemplary disclosed monitored object, which may be acquired (e.g., obtained or extracted) from the exemplary disclosed input information by the exemplary disclosed monitored object digital application, may be information of a specific anchor (e.g., individual user) that may be matched by the exemplary disclosed monitored object digital application (e.g., one or more specific anchors determined by the input information, for example an ID of the one or more specific anchors). In at least some exemplary embodiments, the exemplary disclosed one or more monitored object may be one or more anchor users of the exemplary disclosed system such as, for example, experienced, high-performing, successful, and/or popular anchor users (e.g., content creators such as performers, for example, erotic human models). Also for example, information related to the exemplary disclosed monitored object that may be acquired (e.g., obtained or extracted) from the exemplary disclosed input information may be information related to a group with specific characteristics (e.g., one or more anchors determined by their nationality, appearance, performance style, and/or any other suitable characteristics). Further for example, information related to the exemplary disclosed monitored object that may be acquired (e.g., obtained or extracted) from the exemplary disclosed input information may be information related to a group with multiple labels (e.g., characteristics not specific to one individual such as, for example, broader categories encompassing multiple or overlapping types of characteristics).

In at least some exemplary embodiments, the exemplary disclosed digital asset associated with the exemplary disclosed monitored object (e.g., or monitored objects) determined by the monitored object digital application may be matched from an existing digital asset or generated by the exemplary disclosed livestreaming digital asset model. The exemplary disclosed interactive information associated with the exemplary disclosed digital asset of the exemplary disclosed monitored object (e.g., or monitored objects) may include the exemplary disclosed creator interaction data and/or the exemplary disclosed audience feedback data. Determining the digital asset associated with the monitored object may include: inputting, via the monitored object digital application, the information related to the monitored object into the livestreaming digital asset model; and processing, via the livestreaming digital asset model, the information related to the monitored object to generate the digital asset of the monitored object. The creator interaction data associated with the digital asset of the monitored object may include at least one of motion characteristic data, voiceprint characteristic data, image characteristic data, or performance content segment data, which may characterize one or more features of a creator. For example, the exemplary disclosed creator interaction data may include information (e.g., data) relating to an ID (e.g., identification information), action performance (e.g., livestreaming performance), makeup (e.g., cosmetics), clothing, reply words (e.g., performance dialogue), voice (e.g., voice characteristics), live broadcast props (e.g., camera type, microphone type, toys used in the broadcast, lighting characteristics, and/or any other props), personal profile details of the anchor, and/or any other suitable creator information. The audience feedback data associated with the digital asset of the monitored object may include at least one of tipping operation data, comment operation data, toy control operation data, or viewing duration data, which may characterize one or more features of an audience. The exemplary disclosed audience feedback data may include information (e.g., data) relating to the exemplary disclosed digital asset of the monitored object (e.g., or monitored objects). For example, the exemplary disclosed audience feedback data may include information (e.g., data) relating to comments, rewards, viewing time, tipping data (e.g., aggregate amount of tips and tip amounts per viewer user), number of viewers (e.g., size of audience) in the live broadcast room, number of sync toys of viewers, toy sensor data (e.g., detecting “audience climax” to determine the content creator’s performance climax or highlight moments), following time of the audience, and/or any other suitable audience feedback information.

In at least some exemplary embodiments, the exemplary disclosed system and method may provide the exemplary disclosed digital assets (e.g., allow the use or sedimentation of live performance data from anchor users to form respective digital assets of the anchor users). The exemplary disclosed digital assets may be leveraged across other domains (e.g., systems other than system 300 such as publicly available systems), which may create additional value for anchor users. The exemplary disclosed system and method may provide digital assets of relatively more experienced (e.g., top-tier) anchors to relatively newer and/or lesser-known anchors (e.g., relative to the top-tier anchors), so that the relatively newer and/or lesser-known anchors may learn the performance content and/or style of established anchors. This may facilitate relatively rapid acquisition of livestreaming skills by the relatively newer and/or lesser-known anchors. Based on the exemplary disclosed digital assets of the anchors, the exemplary disclosed system and method may provide a systematic livestreaming framework that may be established and used to provide guidance and direction for relatively newer and/or lesser-known anchors to improve their livestreaming activities (e.g., more effectively generate income and better entertain viewers).

In a first exemplary embodiment, the exemplary disclosed monitored object digital application may be a digital application for use by anchor users such as content creators (e.g., performers such as erotic human models). Activating the monitored object digital application for the user may include at least one of activating the monitored object digital application for a creator end-user prior to initiation of a livestreaming session of the creator end-user, activating the monitored object digital application for the creator end-user during the livestreaming session, or activating the monitored object digital application for the creator end-user following termination of the livestreaming session. For example, the step of activating the monitored object digital application for the anchor user such as a content creator (e.g., performer such as an erotic human model) may include at least one of: activating the exemplary disclosed monitored object digital application for a creator user (e.g., an anchor user such as a content creator) prior to initiation of livestreaming (e.g., a livestreaming session) by the creator user; activating the exemplary disclosed monitored object digital application for the creator user during the livestreaming; or activating the exemplary disclosed monitored object digital application for the creator user following termination of the livestreaming.

In the first exemplary embodiment, during the livestreaming of the anchor user (e.g., the creator user), the exemplary disclosed activated monitored object digital application may provide the exemplary disclosed interactive information to the anchor user in real-time (e.g., real-time or near real-time). Providing the exemplary disclosed interactive information may include providing live broadcast guidance, which may be related to the exemplary disclosed digital assets (e.g., anchor digital assets). By collecting livestreaming data from anchor users (e.g., platform anchors such as, for example, senior or relatively more experienced and effective anchor users) and subsequently training the exemplary disclosed livestreaming digital asset model with such data, the exemplary disclosed system may generate digital assets associated with these senior anchors (e.g., relatively more experienced and effective anchor users). These digital assets may be utilized by the exemplary disclosed system to guide other anchor users (e.g., content creators such as performers, for example, erotic human models) such as, for example, new anchor users, junior anchor users, and/or less experienced anchor users.

Providing the user, via the monitored object digital application, with the interactive information including the creator interaction data or the audience feedback data associated with the digital asset of the monitored object may include: via the monitored object digital application, during the livestreaming session of the creator end-user, in response to a livestreaming scenario of the creator end-user satisfying a predetermined condition, providing the creator end-user with the interactive information including the creator interaction data or the audience feedback data associated with the digital asset of the monitored object. The monitored object may include a specific creator or a specific group of creators. The interactive information may include behavioral data of the specific creator or the specific group of creators from a same or similar livestreaming scenario as that of the creator end-user. Providing the user, via the monitored object digital application, with the interactive information including the creator interaction data or the audience feedback data associated with the digital asset of the monitored object may include: via the monitored object digital application, prior to or during the livestreaming session of the creator end-user, providing the creator end-user with the interactive information including the creator interaction data or the audience feedback data associated with the digital asset of the monitored object. The monitored object may include a specific creator or a specific group of creators. The interactive information may include performance content information of the specific creator or the specific group of creators. As an illustrative example of the first exemplary embodiment, a new or junior anchor (e.g., Ela) may desire to learn from the performance of a senior or experienced anchor (e.g., Lisa). The exemplary disclosed monitored object digital application may, during new anchor Ela's livestream, monitor new anchor Ela's livestream data including data such as, for example, new anchor Ela's performance data (e.g., visual content, movements of new anchor Ela, facial expressions of new anchor Ela, vocal characteristics of new anchor Ela, emotional state of new anchor Ela, and/or any other suitable characteristics of new anchor Ela), audience interaction data of new anchor Ela's livestream (e.g., viewing duration, tipping actions, comment actions, and/or any other suitable characteristics of new anchor Ela's livestream). The exemplary disclosed monitored object digital application may then determine whether new anchor Ela's livestream data satisfies a predetermined condition that may include, for example, a determination of whether a scenario substantially identical to or substantially similar to a scenario that has occurred in at least one or more of experienced anchor Lisa's livestreaming sessions. If the exemplary disclosed predetermined condition has been met, the digital application may provide the exemplary disclosed interactive information associated with experienced anchor Lisa's digital assets (e.g., in which the digital asset may be of monitored object Lisa) to new anchor Ela.

Figure 6:
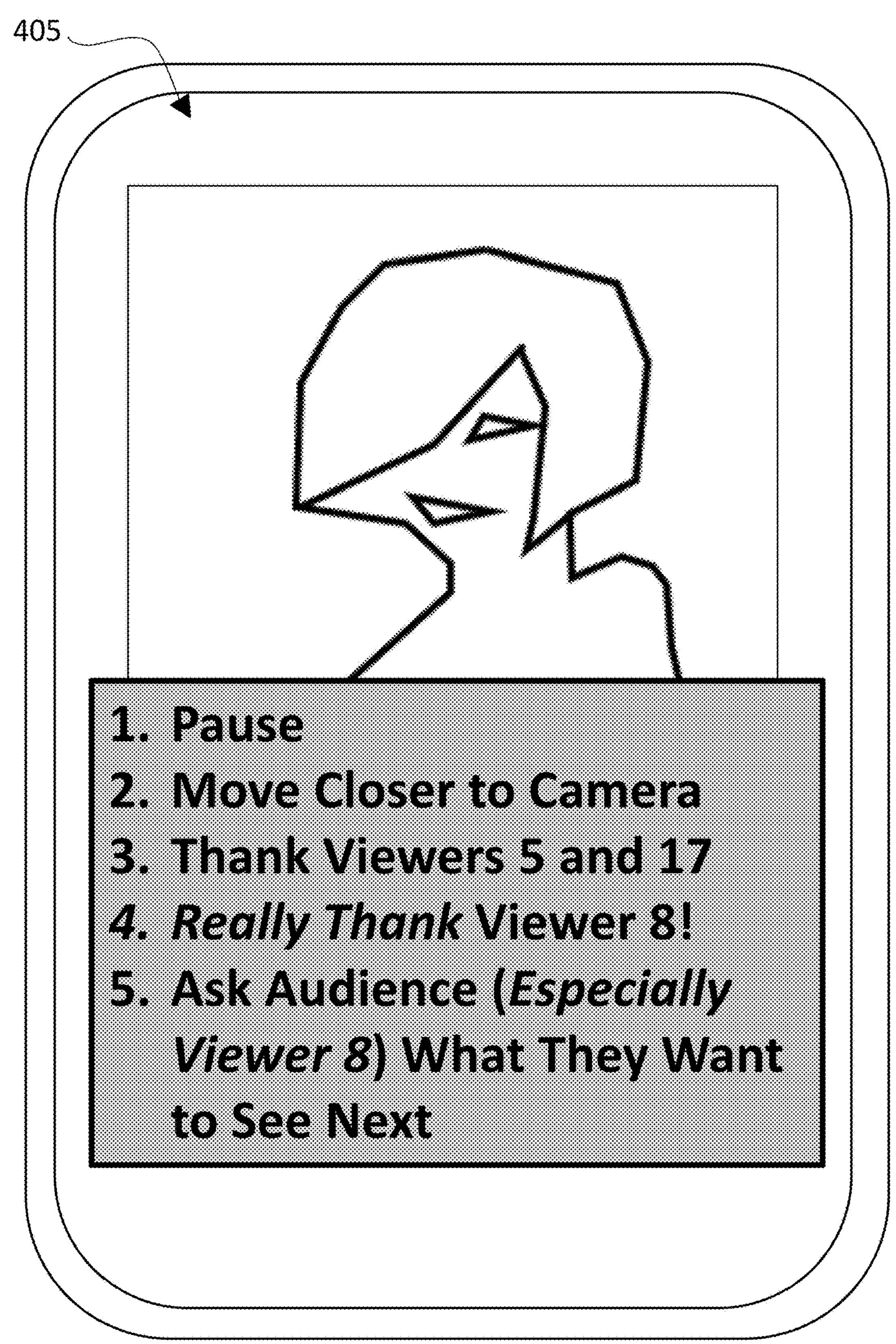
FIG. 6 is a schematic illustration of an exemplary embodiment of the exemplary disclosed system.

In the illustrative example of the first exemplary embodiment described above, new anchor Ela may for example perform a chest-rubbing performance for five continuous minutes during her livestream, which may earn (e.g., attract) tips from five viewer users. The exemplary disclosed system (e.g., the exemplary disclosed monitored object digital application) may determine that experienced anchor Lisa had previously performed a similar act, and following that act experienced anchor Lisa had paused to thank the viewers who tipped during that segment (e.g., particularly those who gave high-value tips), and had asked the audience what performance they would like to see next. If the most frequent response (e.g., or the response from high-value tipper users) during experienced anchor Lisa's livestream was a spanking performance, and experienced anchor Lisa had subsequently proceeded to perform spanking, which further attracted viewer tips for experienced anchor Lisa, the exemplary disclosed monitored object digital application may make suggestions to new anchor Ela based on this data of the digital asset of experienced anchor Lisa. For example and as illustrated in FIG. 6, the exemplary disclosed monitored object digital application may output interactive suggestions on new anchor Ela's GUI 405 such as, for example, suggesting to new anchor Ela to pause Ela's current performance, move closer to the camera, thank certain viewers who tipped recently (e.g., especially a certain particularly high-tipping viewer user), and ask the audience (e.g., particularly the high-tipping viewer user) what performance the viewer users would like to see next. Also for example, because experienced anchor Lisa's spanking performance may have earned significant tips, the exemplary disclosed monitored object digital application may suggest to new anchor Ela to pause Ela's current performance, move closer to the camera, thank certain viewers who tipped recently (e.g., especially a certain particularly high-tipping viewer user), and begin a spanking performance without querying the audience first.

As another illustrative example of the first exemplary embodiment described above, when a new or junior anchor (e.g., new anchor Ela) may lack a specific reference anchor for guidance, the exemplary disclosed monitored object digital application may, during new anchor Ela's livestream, monitor new anchor Ela's livestream data in real-time (e.g., real-time or near real-time) and provide corresponding interactive suggestions based on one or more digital assets from experienced anchors having similar characteristics to new anchor Ela (e.g., to form a plurality of digital assets having characteristics similar to new anchor Ela based for example on the exemplary disclosed input information associated with Ela). For example, if Ela appears to be an innocent anchor of Asian race (e.g., a sweet-looking Asian anchor) wearing JK-style attire and performing a chest-shaking segment during her livestream, the exemplary disclosed monitored object digital application may reference digital assets of anchors with similar characteristics and may output an interactive suggestion. For example, the exemplary disclosed monitored object digital application may make a suggestion such as: "Ela, based on analysis of comparable performer profiles, your audience may respond positively to a chest-rubbing performance. You may consider partially adjusting your outfit (take off some clothes) and performing a chest-rubbing performance for approximately five minutes to enhance viewer engagement."

Figure 7:
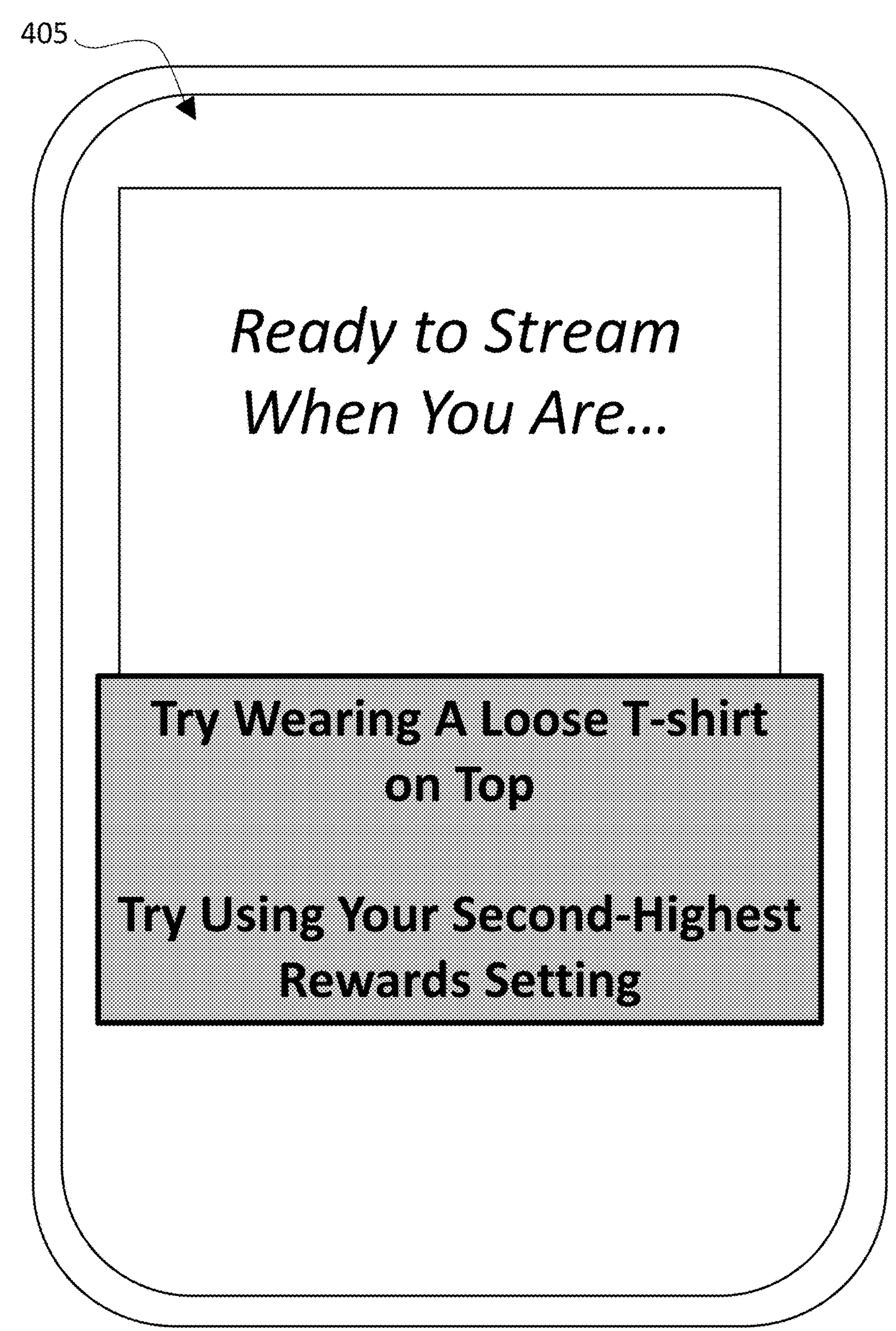
FIG. 7 is a schematic illustration of an exemplary embodiment of the exemplary disclosed system.

As another illustrative example of the first exemplary embodiment, before an anchor user (e.g., a new anchor user) begins a livestream (e.g., broadcasts live), the activated exemplary disclosed monitored object digital application may provide the new anchor user with interactive information related to one or more experienced anchor user's digital assets in real-time (e.g., real-time or near real-time). The exemplary disclosed interactive information may include information such as, for example, guiding the new anchor user's dressing style, reward rule settings the new anchor user should consider using, and/or any other suitable guiding information based on the digital assets of one or more experienced anchors (e.g., existing livestream broadcast digital assets). For example as illustrated in FIG. 7, the exemplary disclosed interactive information may be displayed to the new anchor user via the new anchor user's GUI 405, including for example suggestions to wear certain clothing, use certain settings, and/or any other suitable interactive information.

As another illustrative example of the first exemplary embodiment, after an anchor user (e.g., a new anchor user) has started livestreaming (e.g., or ended a livestream), the activated exemplary disclosed monitored object digital application may provide the new anchor user with interactive information related to one or more experienced anchor's digital assets. The exemplary disclosed interactive information may include information such as, for example, guiding the new anchor user's next livestreaming time (e.g., when to begin livestreaming and for how long), suggestions regarding the new anchor user's clothing style, suggestions regarding the new anchor user's livestreaming content, and/or any other suitable guiding information based on the digital assets of one or more experienced anchors (e.g., existing livestream broadcast digital assets).

In a second exemplary embodiment, the exemplary disclosed monitored object digital application may be a digital application for use by audience users such as viewer users (e.g., users watching live broadcasts). Viewer users (e.g., audience users) may input information specifying a particular anchor user (e.g., content creator) or a particular category of anchor users (e.g., content creators such as performers, for example, erotic human models) they wish to follow. The exemplary disclosed monitored object digital application, based on this input (e.g., subscriber input), may determine (e.g., identify) one or more exemplary disclosed digital assets associated with the relevant anchor user and/or anchor user type, and may provide the viewer user (e.g., audience member or user) with corresponding interactive information (e.g., based on the determined or selected digital asset or digital assets). Also, providing the user, via the monitored object digital application, with the interactive information including the creator interaction data or the audience feedback data associated with the digital asset of the monitored object may include: via the monitored object digital application, during the livestreaming session of the creator end-user, in response to receiving audience interaction data from an audience member, providing the creator end-user with associated interactive information of the interactive information, the associated interactive information being configured to respond to the audience interaction data from the audience member on behalf of the creator end-user. For example, instructions and/or suggestions for responding to the audience member may be provided to the anchor user via GUI 405 of the anchor user and/or the exemplary disclosed monitored object digital application may respond directly to the audience member (e.g., based on settings and/or input set or provided by the anchor user).

Activating the monitored object digital application for the user may include activating the monitored object digital application including an interactive entity for a general end-user, the interactive entity being associated with the monitored object, and the monitored object digital application being configured to: present, to the general end-user, the creator interaction data associated with the digital asset of the monitored object to render a digital representation of the monitored object; or in response to an interactive operation performed by the general end-user with the interactive entity, present, to the general end-user, the creator interaction data associated with the digital asset of the monitored object to render at least one of motion characteristic data, voiceprint characteristic data, image characteristic data, or performance content data of the monitored object. As an illustrative example of the second exemplary embodiment, if a viewer user (e.g., an audience user) wishes to monitor whether an experienced anchor (e.g., experienced anchor Lisa) is performing a striptease act, the exemplary disclosed monitored object digital application may (e.g., based on the viewer's input) monitor the livestreaming data of experienced anchor Lisa. If the exemplary disclosed monitored object digital application determines that experienced anchor Lisa's livestream data satisfies a predefined condition associated with the subscriber's input of the viewer user (e.g., detection of a striptease-like performance), the exemplary disclosed monitored object digital application may provide exemplary disclosed interactive information (e.g., including sending a relevant notification) to the viewer user (e.g., audience user). Also for example, in response to the viewer user's operation using (e.g., audience user's operation on) the exemplary disclosed interactive information, content displayed on the viewer user's GUI 405 may be correspondingly adjusted. For example, a current browsing page displayed on the viewer user's GUI 405 (e.g., on the audience user's terminal) may be redirected to a live broadcast room page of the specific anchor user associated with the exemplary disclosed interactive information.

As another illustrative example of the second exemplary embodiment, if a viewer user (e.g., an audience user) wishes to monitor whether experienced anchor Lisa (e.g., anchor user Lisa) is performing a striptease-like act, the exemplary disclosed monitored object digital application (e.g., based on the audience or viewer user's input) may monitor the livestream data of experienced anchor Lisa. If the exemplary disclosed monitored object digital application determines that experienced anchor Lisa's livestream data satisfies a predetermined condition associated with the subscriber input of the viewer user (e.g., detection of a striptease-like performance), then the exemplary disclosed monitored object digital application may provide interactive information to the viewer user (e.g., the audience user). Providing the exemplary disclosed interactive information by the exemplary disclosed monitored object digital application may include recording a clip of experienced anchor Lisa's striptease performance and providing it to the viewer user (e.g., audience user). In at least some exemplary embodiments, this operation may involve a paid subscription by the viewer user (e.g., audience user). For example, to participate in the exemplary disclosed operation, the exemplary disclosed user input of the viewer user may satisfy the exemplary disclosed specific activation condition described above based on the viewer user providing payment. Regarding the exemplary disclosed recording and storage, providing the user, via the monitored object digital application, with the interactive information including the creator interaction data or the audience feedback data associated with the digital asset of the monitored object may include: via the monitored object digital application, during the livestreaming session of the creator end-user, in response to a livestreaming scenario of the creator end-user satisfying a predetermined condition, providing the creator end-user with a recording and storage of the livestreaming scenario to preserve the interactive information including the creator interaction data or the audience feedback data associated with the creator end-user.

In a third exemplary embodiment, the exemplary disclosed monitored object digital application may be a digital application for ordinary users (e.g., end users such as anchor users and/or viewers). Activating the monitored object digital application for the user may include: activating the monitored object digital application including an interactive entity for a general end-user, the interactive entity being associated with the monitored object, and the monitored object digital application being configured to: present, to the general end-user, the creator interaction data associated with the digital asset of the monitored object to render a digital representation of the monitored object; or in response to an interactive operation performed by the general end-user with the interactive entity, present, to the general end-user, the creator interaction data associated with the digital asset of the monitored object to render at least one of motion characteristic data, voiceprint characteristic data, image characteristic data, or performance content data of the monitored object. For example, the exemplary disclosed digital assets of the anchors may be integrated into a virtual entity (e.g., an AI virtual entity) that may be generated by the exemplary disclosed monitored object digital application. The exemplary disclosed virtual entity (e.g., AI entity) may embody the characteristics of the anchor user associated with the digital asset such as, for example, the appearance, movements, speech patterns, and/or any other characteristics of the anchor user.

As an illustrative example of the third exemplary embodiment, if a given user (e.g., end user or viewer user) wishes for the exemplary disclosed AI virtual entity to possess the traits of experienced anchor Lisa, the exemplary disclosed monitored object digital application may apply the exemplary disclosed digital assets associated with experienced anchor Lisa to the AI entity based on the existing digital assets of experienced anchor Lisa. The exemplary disclosed monitored object digital application may thereby provide an AI entity that replicates experienced anchor Lisa's visual likeness. When the given user interacts with the AI entity derived from the digital assets of experienced anchor Lisa, the AI entity may provide responses based on the behavioral and interactive patterns derived from experienced anchor Lisa's digital assets. Any other desired digital assets may also be used to similarly create the exemplary disclosed virtual entity (e.g., AI entity). For example, available digital assets of a less experienced anchor such as new anchor Ela could be used to create the exemplary disclosed virtual entity (e.g., AI entity).

Figure 8:
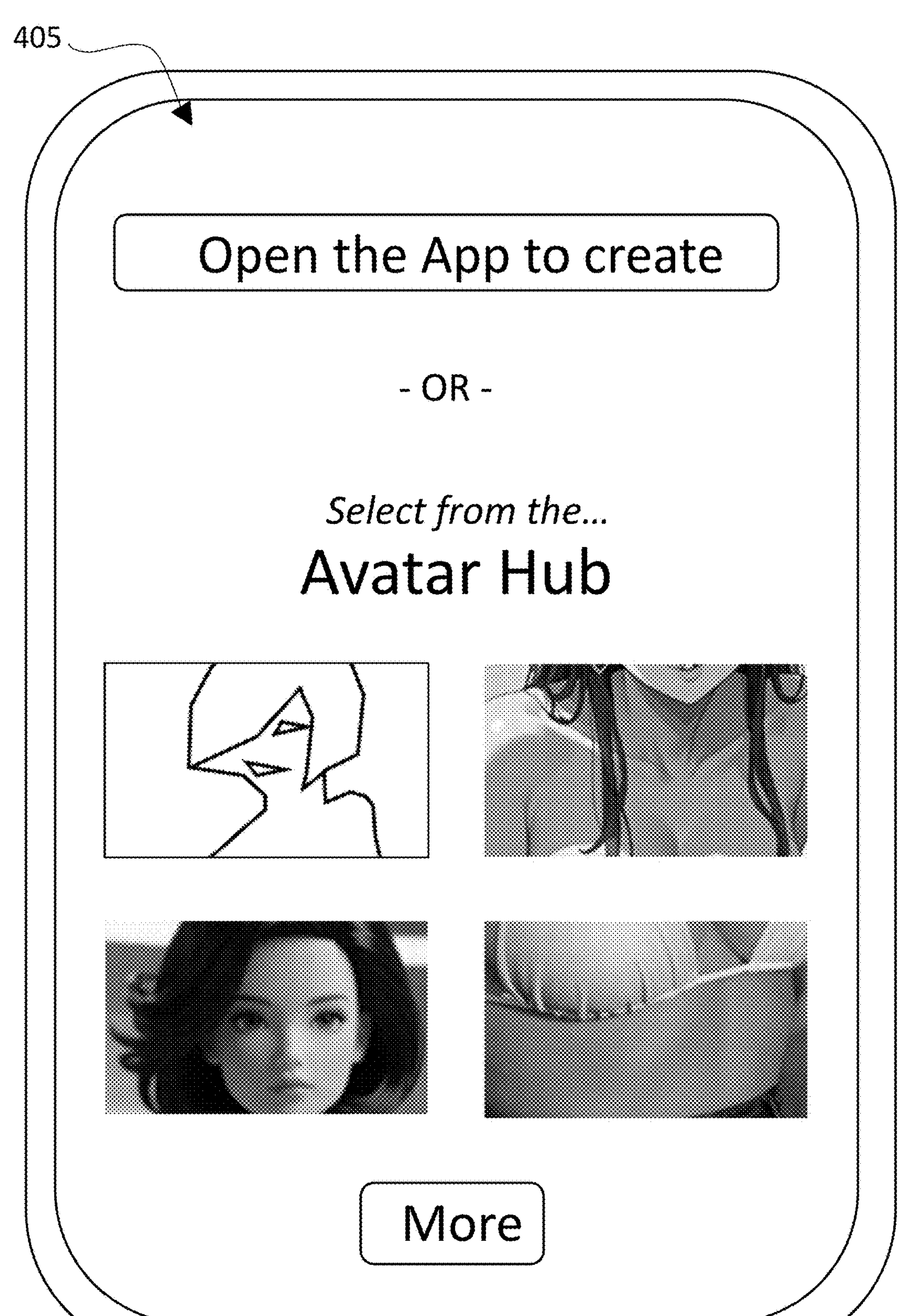
FIG. 8 is a schematic illustration of an exemplary embodiment of the exemplary disclosed system.

As another illustrative example of the third exemplary embodiment, if a given user wishes for the exemplary disclosed virtual entity (e.g., AI entity) to possess the traits of an anchor user Lala, but there is no digital asset related (e.g., yet related) to anchor Lala, the exemplary disclosed monitored object digital application may provide (e.g., input) data related to anchor Lala into a digital asset model provided for the content creator (e.g., newly provided digital asset model). The exemplary disclosed monitored object digital application may use the newly created digital asset model to generate digital assets related to Lala. The exemplary disclosed monitored object digital application may generate the exemplary disclosed virtual entity (e.g., AI entity) for Lala using the digital assets related to Lala similar to for example as described above. In at least some exemplary embodiments, the exemplary process may be initiated by the given user using GUI 405 of the given user for example as illustrated in FIG. 8. For example as illustrated in FIG. 8, the given user may use an avatar hub or library of virtual entities (e.g., AI entities) to select a desired AI entity, or may activate (e.g., open) the exemplary disclosed monitored object digital application to have an AI entity generated for example as described below. In at least some exemplary embodiments, the given user may provide input to guide the creation of the AI entity including, for example, providing desired characteristics, inputting that the AI entity may be a combination of anchor users, indicating celebrities the AI entity should resemble (e.g., with the exemplary disclosed monitored object digital application obtaining characteristic data from public available sources), and/or any other desired input.

Figure 9:
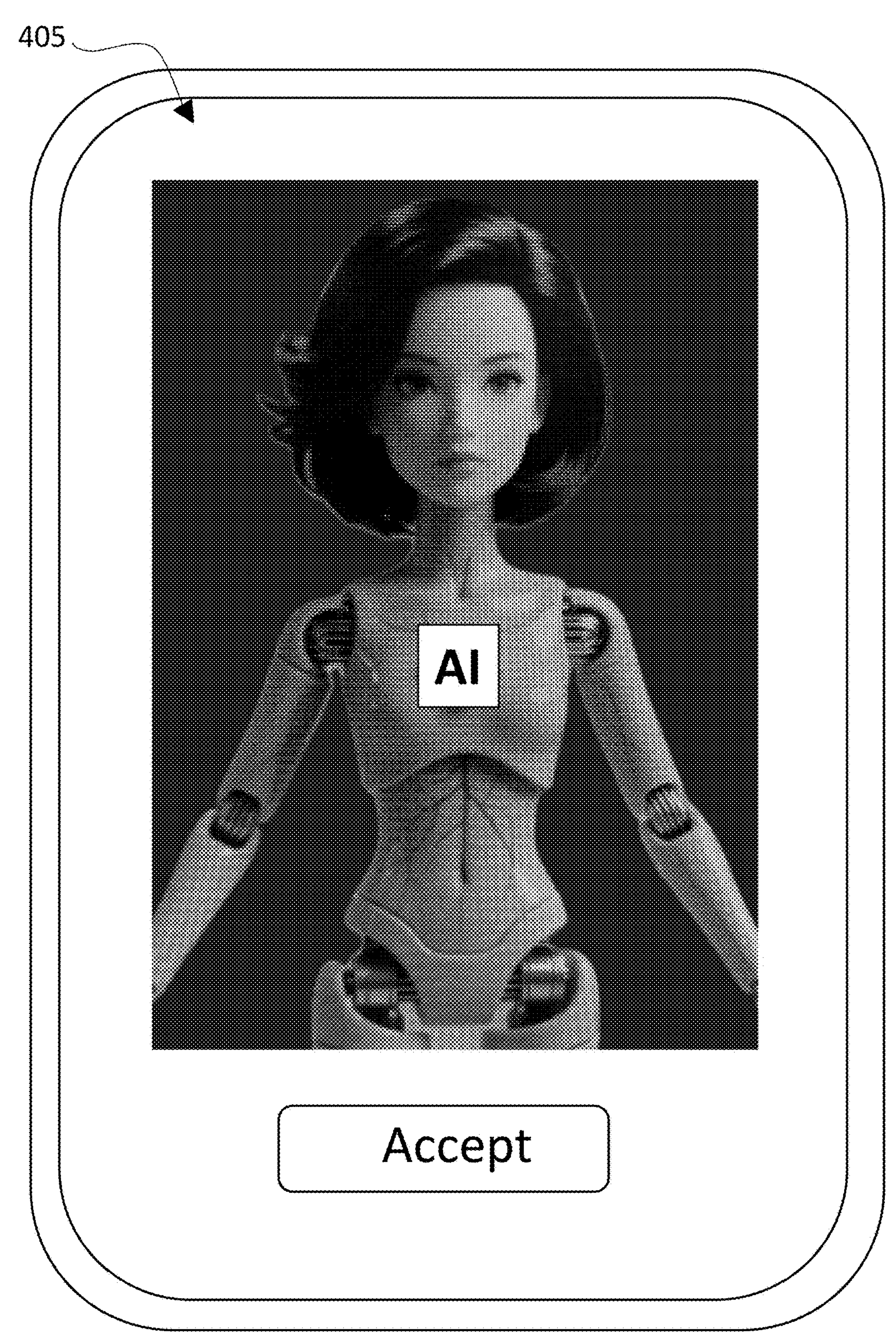
FIG. 9 is a schematic illustration of an exemplary embodiment of the exemplary disclosed system.

As another illustrative example of the third exemplary embodiment, digital assets of a given anchor (e.g., or a plurality of anchors) may be integrated into a physical entity such as, for example, an AI doll entity for example as illustrated in FIG. 9. The exemplary disclosed monitored object digital application may provide (e.g., generate a rendering of) an AI doll entity that may embody the anchor's characteristics such as appearance, movements, speech patterns, and/or any other suitable characteristics based on the anchor user's digital assets. For example, if a given user (e.g., viewer user or end user) wishes for the AI doll entity to possess the traits of a certain anchor (e.g., anchor user Lisa), the exemplary disclosed monitored object digital application may apply the digital assets associated with Lisa to the AI doll entity. The AI doll entity generated by the exemplary disclosed monitored object digital application may thereby replicate anchor Lisa's visual likeness and, when the given user interacts with the AI doll entity, the AI doll entity may provide responses based on behavioral and/or interactive patterns derived from anchor Lisa's digital assets. In at least some exemplary embodiments, the given user may provide input to guide the creation of the AI doll entity including, for example, providing desired characteristics, inputting that the AI doll entity may be a combination of anchor users, indicating celebrities the AI doll entity should resemble (e.g., with the exemplary disclosed monitored object digital application obtaining characteristic data from public available sources), and/or any other desired input.

In a fourth exemplary embodiment, the exemplary disclosed monitored object digital application may generate the exemplary disclosed digital asset using the exemplary disclosed livestreaming digital asset model. The exemplary disclosed digital asset associated with the exemplary disclosed monitored object (e.g., one or more anchor users) determined by the exemplary disclosed monitored object digital application may be matched from an existing digital asset or generated by the livestreaming digital asset model. The exemplary disclosed monitored object digital application may determine the digital asset associated with the monitored object, including matching, via the monitored object digital application, the digital asset of the monitored object from pre-established digital assets (e.g., existing digital assets of anchor users). The pre-established digital assets may be configured to be generated by the livestreaming digital asset model based on training performed on the collected data clusters.

As an illustrative example of the fourth exemplary embodiment, a digital asset associated with a user input may be determined by the exemplary disclosed monitored object digital application from generated creator digital assets (e.g., of anchor users). For example for digital assets similar to as described above in the exemplary first embodiment, the exemplary disclosed monitored object digital application may provide the user with relevant exemplary disclosed interactive information based on existing digital assets of anchor users (e.g., the existing model digital assets). Also for example for digital assets similar to as described above in the exemplary third embodiment, the exemplary disclosed monitored object digital application may provide the user with relevant exemplary disclosed interactive information based on existing digital assets of anchor users (e.g., the existing model digital assets).

As another illustrative example of the fourth exemplary embodiment, in situations in which no suitable pre-existing digital assets may be available, the exemplary disclosed monitored object digital application may generate a digital asset in real-time (e.g., real-time or near real-time) using the exemplary disclosed digital asset model of a given anchor user based on extracted information related to the monitored object (e.g., the given anchor user). For example for digital assets similar to as described above in the exemplary third embodiment, the exemplary disclosed monitored object digital application may provide the user with relevant exemplary disclosed interactive information from a given digital asset associated with a given monitored object. The given digital asset may be generated by the exemplary disclosed livestreaming digital asset model based on the exemplary disclosed extracted information related to the given monitored object (e.g., one or more anchor users).

As another illustrative example of the fourth exemplary embodiment, the exemplary disclosed monitored object digital application may provide the user with relevant exemplary disclosed interactive information from a given digital asset associated with a given monitored object (e.g., a given anchor user) generated by the exemplary disclosed livestreaming digital asset model based on exemplary disclosed extracted information related to the monitored object in real-time (e.g., real-time or near real-time). For example, the digital asset associated with the monitored object may be generated by the exemplary disclosed monitored object digital application based on real-time livestreaming data of the monitored object (e.g., the given anchor user).

As another illustrative example of the fourth exemplary embodiment, the exemplary disclosed digital asset associated with the exemplary disclosed monitored object (e.g., an anchor user) may be generated by the exemplary disclosed monitored object digital application based on live broadcast data of the monitored object collected substantially continuously over a period of time. The exemplary disclosed monitored object digital application may generate the digital asset generally similar to as described above in the third exemplary embodiment.

In a fifth exemplary embodiment, the exemplary disclosed digital asset associated with the exemplary disclosed monitored object may include one or more anchor users (e.g., one anchor user or a plurality of anchor users). The digital asset of the monitored object may include at least one of a designated creator digital asset associated with one or more designated creators (e.g., anchor users), a type digital asset associated with one or more designated types of creators, or a common digital asset formed from one or more common data elements associated with a plurality of creators. For example, the digital asset associated with the monitored object may comprise a digital asset associated with one or more designated creators (e.g., anchor users) for example as described in the first exemplary embodiment. Also for example, the digital asset associated with the monitored object may comprise a digital asset associated with one or more designated types of creators (e.g., types of anchor users) for example as described in the first exemplary embodiment. Further for example, the digital asset associated with the monitored object may comprise a digital asset formed from one or more common data elements associated with a plurality of creators (e.g., data elements found in common between a plurality of anchor users) for example as described in the first exemplary embodiment.

As another illustrative example of the fifth exemplary embodiment, the collection of data clusters from one or more anchor users (e.g., experienced or senior content creators such as performers, for example, erotic human models) may be performed by the system with (e.g., subject to) authorization by the experienced or senior content creators (e.g., performers such as erotic human models). For example, the monitored object digital application may query experienced or senior content creators (e.g., performers such as erotic human models) for authorization to perform the collection of data clusters from those users and/or receive authorization from experienced or senior content creators (e.g., performers such as erotic human models) to perform the collection of data clusters from those users. Further, if anchor users such as junior content creators (e.g., less experienced content creators such as performers, for example, erotic human models) and/or audience users (e.g., viewers) utilize digital assets trained based on the data clusters from the experienced or senior content creators (e.g., use of digital assets that have been authorized for use by the anchor users associated with those digital assets), a portion of or substantially all revenue generated by the use of those digital assets may be given to the experienced or senior content creators associated with the utilized digital asset or assets. For example, if a digital asset associated with a given experienced or senior content creator is used by a junior content creator or audience member (e.g., viewer user), that junior content creator or audience member may pay for the use of the digital asset directly (e.g., via the monitored object digital application as a direct payment and/or as a paid subscription or part of a paid subscription) and/or the experienced or senior content creator may be paid by receiving some or substantially all revenue generated by use of the digital asset (e.g., revenue including tips paid by audience members such as viewers to a junior user utilizing the digital asset of the experienced or senior content creator in a livestream of the junior user).

Figure 10:
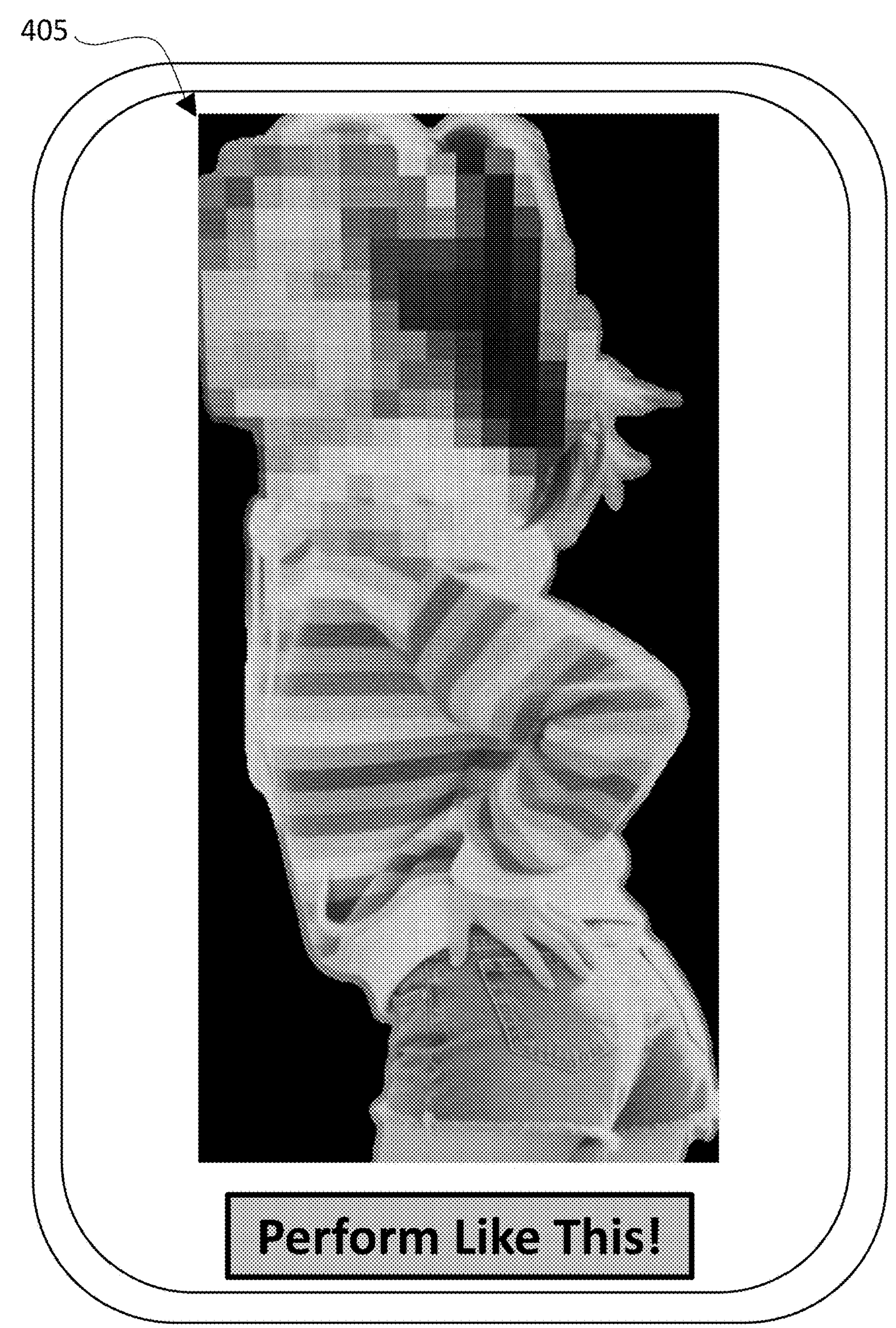
FIG. 10 is a schematic illustration of an exemplary embodiment of the exemplary disclosed system.

In a sixth exemplary embodiment, providing the user with the interactive information including the creator interaction data or the audience feedback data associated with the digital asset of the monitored object may include determining a presentation format for the digital asset, and providing the user with the interactive information associated with the digital asset of the monitored object in the determined presentation format. For example, the exemplary disclosed monitored object digital application may determine a presentation format for the digital asset and provide the user with the interactive information associated with the digital asset of the monitored object in the determined presentation format. For example, the exemplary disclosed monitored object digital application may determine the display of the interactive information in an anthropomorphic form. As an illustrative example, if the interactive information is to guide the anchor user (e.g., a new anchor user) to perform a butt-patting performance, the exemplary disclosed monitored object digital application may present the butt-patting performance to the anchor user (e.g., the new anchor user) in an anthropomorphic form, so that the anchor user may perceive (e.g., clearly perceive) the interactive information for example as illustrated in FIG. 10. For example, digital assets associated with a specific anchor user may be displayed in anthropomorphic form for example as illustrated in FIG. 10. Also for example, the exemplary disclosed monitored object digital application may determine text and voice characteristics for presenting the digital assets and output (e.g., present) the interactive information in text and/or voice format (e.g., form).

In a seventh exemplary embodiment, the livestreaming digital asset model may be deployed by the monitored object digital application through: monitoring and collecting the collected data clusters associated with a creator, the collected data clusters including the creator interaction data and the audience feedback data from historical livestreaming sessions, personal data of the creator, and personal data of audience members; parsing the creator interaction data, the personal data of the creator, and the personal data of the audience members into content parameters; parsing the audience feedback data into control parameters; extracting numerical features from the content parameters and the control parameters, and training a preset model therewith to obtain a trained livestreaming digital asset model, wherein the trained livestreaming digital asset model may include feature digital assets characterizing features of the creator and features of the audience members; and encapsulating the trained livestreaming digital asset model and deploying it to the user-oriented monitored object digital application. For example, the exemplary disclosed monitored object digital application may use (e.g., deploy) the exemplary disclosed livestreaming digital asset model using the following steps. The exemplary disclosed monitored object digital application (e.g., deploying the exemplary disclosed livestreaming digital asset model) may first monitor and collect data clusters associated with a creator (e.g., an anchor user such as an experienced anchor user), the data clusters comprising the exemplary disclosed creator interaction data and audience feedback data from historical livestreaming sessions, personal data of the creator, personal data of audience members, and/or any other suitable data (e.g., such as data of a livestream room or any other suitable data). The exemplary disclosed monitored object digital application (e.g., deploying the exemplary disclosed livestreaming digital asset model) may then parse the exemplary disclosed creator interaction data, the personal data of the creator, and the personal data of the audience members into content parameters. The exemplary disclosed monitored object digital application (e.g., deploying the exemplary disclosed livestreaming digital asset model) may then parse the exemplary disclosed audience feedback data into control parameters. The exemplary disclosed monitored object digital application (e.g., deploying the exemplary disclosed livestreaming digital asset model) may then extract numerical features from the content parameters and the control parameters, and train a preset model therewith to obtain a trained livestreaming digital asset model. The trained model may comprise digital assets characterizing features of the creator and features of the audience. The exemplary disclosed monitored object digital application (e.g., deploying the exemplary disclosed livestreaming digital asset model) may encapsulate (e.g., use and/or include) the trained exemplary disclosed livestreaming digital asset model and deploy it to the user-oriented exemplary disclosed monitored object digital application.

In at least some exemplary embodiments, the exemplary disclosed livestreaming digital asset model may be provided as a Model as a Service (MaaS). The exemplary disclosed livestreaming digital asset model may be provided as a pre-trained machine learning model that may be provided via the system 300 (e.g., via the exemplary disclosed monitored object digital application). Users such as the exemplary disclosed content creators (e.g., anchor users such as performers, for example, erotic human models), viewer users (e.g., audience members), and/or any other suitable third parties may provide payment via system 300 or any other suitable platform to use the exemplary disclosed livestreaming digital asset model as a MaaS.

Figure 11:
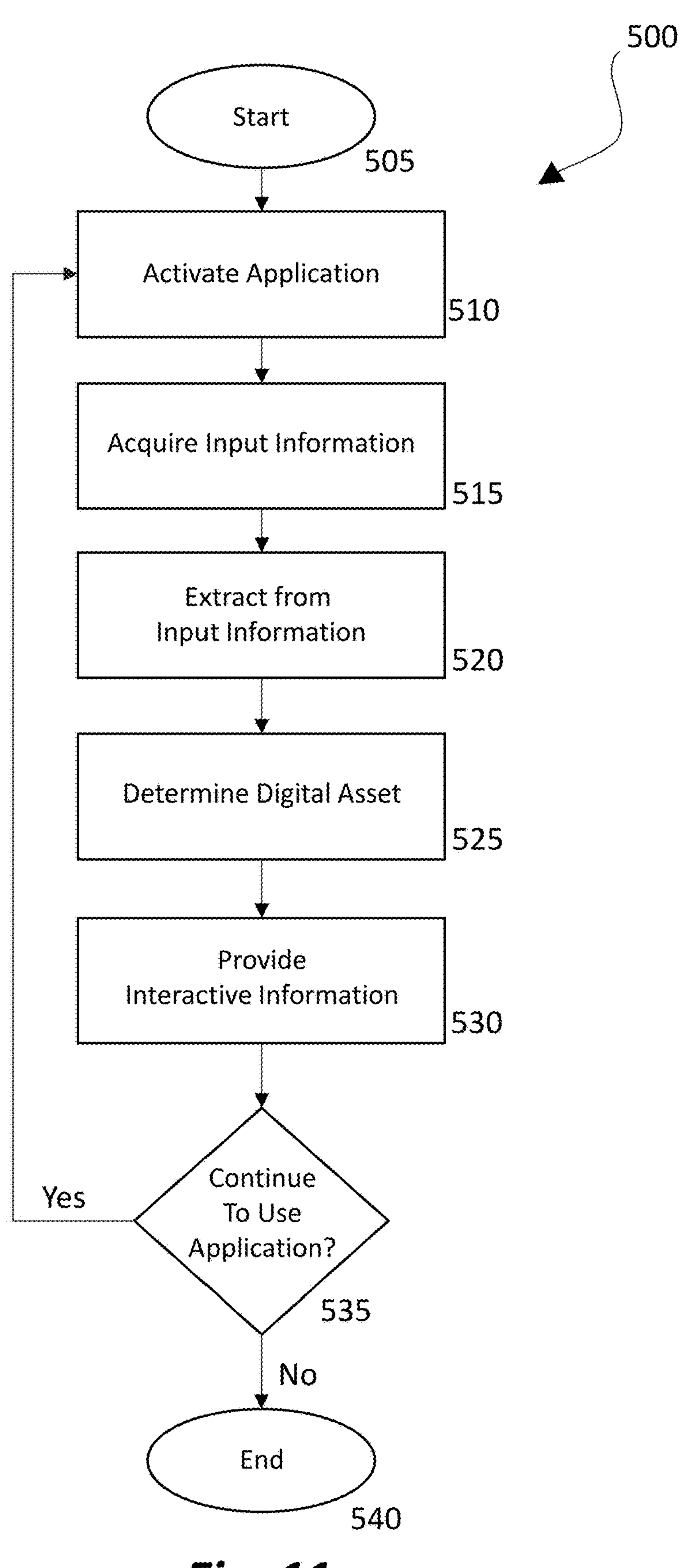
FIG. 11 is a flowchart showing an exemplary process of the present invention.

FIG. 11 illustrates an exemplary process for an operation of system 300. Process 500 begins at step 505. At step 510, the exemplary disclosed system (e.g., system 300), based on the exemplary disclosed livestreaming digital asset model, may activate the exemplary disclosed monitored object digital application for a user in response to the exemplary disclosed user input satisfying the exemplary disclosed specific activation condition. The exemplary disclosed monitored object digital application may be a user-oriented digital application deployed with the livestreaming digital asset model trained on collected data clusters for example as described above.

At step 515, the exemplary disclosed system may acquire input information for example as described above. For example, the exemplary disclosed system may acquire, via the exemplary disclosed monitored object digital application, the exemplary disclosed input information associated with the user (e.g., anchor user) for example as described above.

At step 520, the exemplary disclosed system may extract information related to the exemplary disclosed monitored object for example as described above. For example, the exemplary disclosed system may extract, via the exemplary disclosed monitored object digital application, information related to the exemplary disclosed monitored object from the exemplary disclosed input information for example as described above.

At step 525, the exemplary disclosed system may determine the exemplary disclosed digital asset for example as described above. For example, the exemplary disclosed system may determine, via the exemplary disclosed monitored object digital application, the exemplary disclosed digital asset associated with the exemplary disclosed monitored object for example as described above.

At step 530, the exemplary disclosed system may provide the exemplary disclosed interactive information for example as described above. For example, the exemplary disclosed system may provide, to the user via the exemplary disclosed monitored object digital application, the exemplary disclosed interactive information comprising the exemplary disclosed creator interaction data and/or the exemplary disclosed audience feedback data associated with the exemplary disclosed digital asset of the exemplary disclosed monitored object for example as described above.

At step 535, the exemplary disclosed system may determine whether or not use of exemplary disclosed monitored object digital application is to be continued (e.g., based on anchor user control or input, a predetermined time period elapsing, viewer input, machine learning operations, and/or any other suitable criteria). If use of exemplary disclosed monitored object digital application is to be continued, process 500 may return to step 510. As many iterations as desired of steps 510 through 535 may be performed. If use of exemplary disclosed monitored object digital application is not to be continued, process 500 ends at step 540.

The invention includes other illustrative embodiments ("Embodiments") as follows.

Embodiment 1: A method for interaction based on a livestreaming digital asset model, comprising: activating a monitored object digital application for a user in response to a user input satisfying a specific activation condition, wherein the monitored object digital application is a user-oriented digital application deployed with the livestreaming digital asset model trained on collected data clusters; acquiring, via the monitored object digital application, input information associated with the user; extracting, via the monitored object digital application, information related to a monitored object from the input information; determining, via the monitored object digital application, a digital asset associated with the monitored object; and providing, to the user via the monitored object digital application, interactive information including creator interaction data or audience feedback data associated with the digital asset of the monitored object.

Embodiment 2: The method of Embodiment 1, wherein determining the digital asset associated with the monitored object includes: matching, via the monitored object digital application, the digital asset of the monitored object from pre-established digital assets; wherein the pre-established digital assets are configured to be generated by the livestreaming digital asset model based on training performed on the collected data clusters.

Embodiment 3: The method of Embodiment 1, wherein determining the digital asset associated with the monitored object includes: inputting, via the monitored object digital application, the information related to the monitored object into the livestreaming digital asset model; and processing, via the livestreaming digital asset model, the information related to the monitored object to generate the digital asset of the monitored object.

Embodiment 4: The method of Embodiment 1, wherein the digital asset of the monitored object includes at least one of: a designated creator digital asset associated with one or more designated creators; a type digital asset associated with one or more designated types of creators; or a common digital asset formed from one or more common data elements associated with a plurality of creators.

Embodiment 5: The method of Embodiment 1, wherein: the creator interaction data associated with the digital asset of the monitored object includes at least one of motion characteristic data, voiceprint characteristic data, image characteristic data, or performance content segment data, which characterize one or more features of a creator; and the audience feedback data associated with the digital asset of the monitored object includes at least one of tipping operation data, comment operation data, toy control operation data, or viewing duration data, which characterize one or more features of an audience.

Embodiment 6: The method of Embodiment 1, wherein providing the user with the interactive information including the creator interaction data or the audience feedback data associated with the digital asset of the monitored object includes: determining a presentation format for the digital asset; and providing the user with the interactive information associated with the digital asset of the monitored object in the determined presentation format.

Embodiment 7: The method of Embodiment 1, wherein the monitored object digital application that is the user-oriented digital application includes: an audience digital application for audience end-users; a creator digital application for creator end-users; or a general digital application for general end-users.

Embodiment 8: The method of Embodiment 1, wherein activating the monitored object digital application for the user includes at least one of: activating the monitored object digital application for a creator end-user prior to initiation of a livestreaming session of the creator end-user; or activating the monitored object digital application for the creator end-user during the livestreaming session; or activating the monitored object digital application for the creator end-user following termination of the livestreaming session.

Embodiment 9: The method of Embodiment 8, wherein providing the user, via the monitored object digital application, with the interactive information including the creator interaction data or the audience feedback data associated with the digital asset of the monitored object includes: via the monitored object digital application, during the livestreaming session of the creator end-user, in response to a livestreaming scenario of the creator end-user satisfying a predetermined condition, providing the creator end-user with the interactive information including the creator interaction data or the audience feedback data associated with the digital asset of the monitored object; wherein the monitored object includes a specific creator or a specific group of creators; and wherein the interactive information includes behavioral data of the specific creator or the specific group of creators from a same or similar livestreaming scenario as that of the creator end-user.

Embodiment 10: The method of Embodiment 8, wherein providing the user, via the monitored object digital application, with the interactive information including the creator interaction data or the audience feedback data associated with the digital asset of the monitored object includes: via the monitored object digital application, during the livestreaming session of the creator end-user, in response to receiving audience interaction data from an audience member, providing the creator end-user with associated interactive information of the interactive information, the associated interactive information being configured to respond to the audience interaction data from the audience member on behalf of the creator end-user.

Embodiment 11: The method of Embodiment 8, wherein providing the user, via the monitored object digital application, with the interactive information including the creator interaction data or the audience feedback data associated with the digital asset of the monitored object includes: via the monitored object digital application, during the livestreaming session of the creator end-user, in response to a livestreaming scenario of the creator end-user satisfying a predetermined condition, providing the creator end-user with a recording and storage of the livestreaming scenario to preserve the interactive information including the creator interaction data or the audience feedback data associated with the creator end-user.

Embodiment 12: The method of Embodiment 8, wherein providing the user, via the monitored object digital application, with the interactive information including the creator interaction data or the audience feedback data associated with the digital asset of the monitored object includes: via the monitored object digital application, prior to or during the livestreaming session of the creator end-user, providing the creator end-user with the interactive information including the creator interaction data or the audience feedback data associated with the digital asset of the monitored object; wherein the monitored object includes a specific creator or a specific group of creators; and wherein the interactive information includes performance content information of the specific creator or the specific group of creators.

Embodiment 13: The method of Embodiment 1, wherein activating the monitored object digital application for the user includes: activating the monitored object digital application including an interactive entity for a general end-user, the interactive entity being associated with the monitored object, and the monitored object digital application being configured to: present, to the general end-user, the creator interaction data associated with the digital asset of the monitored object to render a digital representation of the monitored object; or in response to an interactive operation performed by the general end-user with the interactive entity, present, to the general end-user, the creator interaction data associated with the digital asset of the monitored object to render at least one of motion characteristic data, voiceprint characteristic data, image characteristic data, or performance content data of the monitored object.

Embodiment 14: The method of Embodiment 1, wherein activating the monitored object digital application for the user includes: activating, at a terminal of an audience end-user, the monitored object digital application for the audience end-user, the monitored object digital application including a message notification function, and the monitored object including a specific creator; wherein the monitored object digital application is configured to: in response to detecting that a current livestream data of the specific creator meets a predetermined expectation of the audience end-user, output to the audience end-user a message notification indicating that at least one of the creator interaction data or the audience feedback data associated with the digital asset of the specific creator satisfies the predetermined expectation of the audience end-user.

Embodiment 15: The method of Embodiment 14, further comprising in response to an operation performed by the audience end-user on the interactive information, causing the terminal of the audience end-user to redirect a current viewing page to a livestream page of the specific creator associated with the interactive information.

Embodiment 16: The method of Embodiment 1, wherein the livestreaming digital asset model is deployed by the monitored object digital application through: monitoring and collecting the collected data clusters associated with a creator, the collected data clusters including the creator interaction data and the audience feedback data from historical livestreaming sessions, personal data of the creator, and personal data of audience members; parsing the creator interaction data, the personal data of the creator, and the personal data of the audience members into content parameters; parsing the audience feedback data into control parameters; extracting numerical features from the content parameters and the control parameters, and training a preset model therewith to obtain a trained livestreaming digital asset model, wherein the trained livestreaming digital asset model includes feature digital assets characterizing features of the creator and features of the audience members; and encapsulating the trained livestreaming digital asset model and deploying it to the user-oriented monitored object digital application.

Embodiment 17: A system, comprising: at least one module comprising computer-executable code stored in non-volatile memory; and a memory for storing instructions and a processor for executing the instructions; wherein the computer-executable code, when operating on the processor, causes the system to: activate a monitored object digital application for a user in response to a user input satisfying a specific activation condition, wherein the monitored object digital application is a user-oriented digital application deployed with a livestreaming digital asset model trained on collected data clusters; acquire, via the monitored object digital application, input information associated with the user; extract, via the monitored object digital application, information related to a monitored object from the input information; determine, via the monitored object digital application, a digital asset associated with the monitored object; and provide, to the user via the monitored object digital application, interactive information including creator interaction data or audience feedback data associated with the digital asset of the monitored object.

Embodiment 18: The system of Embodiment 17, wherein activating the monitored object digital application for the user includes at least one of: activating the monitored object digital application for a creator end-user prior to initiation of a livestreaming session of the creator end-user; activating the monitored object digital application for the creator end-user during the livestreaming session; or activating the monitored object digital application for the creator end-user following termination of the livestreaming session.

Embodiment 19: A non-transitory computer-readable storage medium, comprising: machine-readable instructions, wherein the machine-readable instructions, when executed by a processor of a controller, cause the controller to: activate a monitored object digital application for a user in response to a user input satisfying a specific activation condition, wherein the monitored object digital application is a user-oriented digital application deployed with a livestreaming digital asset model trained on collected data clusters; acquire, via the monitored object digital application, input information associated with the user; extract, via the monitored object digital application, information related to a monitored object from the input information; determine, via the monitored object digital application, a digital asset associated with the monitored object; and provide, to the user via the monitored object digital application, interactive information including creator interaction data or audience feedback data associated with the digital asset of the monitored object.

Embodiment 20: The non-transitory computer-readable storage medium of Embodiment 19, wherein activating the monitored object digital application for the user includes at least one of: activating the monitored object digital application for a creator end-user prior to initiation of a livestreaming session of the creator end-user; activating the monitored object digital application for the creator end-user during the livestreaming session; or activating the monitored object digital application for the creator end-user following termination of the livestreaming session.

The exemplary disclosed system and method may provide an efficient and effective technique for anchor users (e.g., content creators) to improve their performance based on making use of available livestreaming data associated with previous, successful livestreaming performances. The exemplary disclosed system and method may provide an efficient and effective technique for new anchor users (e.g., content creators) to utilize a digital asset of a successful, experienced anchor user to improve the new anchor user's livestreaming performance. For example, the exemplary disclosed system and method may provide an efficient and effective technique for a systematic livestreaming framework to be provided based on the digital assets of anchor users to provide guidance and direction for new anchor users in their livestreaming activities and performances.

In at least some exemplary embodiments, the exemplary disclosed system and method may utilize sophisticated machine learning and/or artificial intelligence techniques to prepare and submit datasets and variables to cloud computing clusters and/or other analytical tools (e.g., predictive analytical tools) which may analyze such data using artificial intelligence neural networks. The exemplary disclosed system may for example include cloud computing clusters performing predictive analysis. For example, the exemplary neural network may include a plurality of input nodes that may be interconnected and/or networked with a plurality of additional and/or other processing nodes to determine a predicted result. Exemplary artificial intelligence processes may include filtering and processing datasets, processing to simplify datasets by statistically eliminating irrelevant, invariant or superfluous variables or creating new variables which are an amalgamation of a set of underlying variables, and/or processing for splitting datasets into train, test and validate datasets using at least a stratified sampling technique. The exemplary disclosed system may utilize prediction algorithms and approach that may include regression models, tree-based approaches, logistic regression, Bayesian methods, deep-learning and neural networks both as a stand-alone and on an ensemble basis, and final prediction may be based on the model/structure which delivers the highest degree of accuracy and stability as judged by implementation against the test and validate datasets.

The exemplary disclosed system may include an agentic AI system. The agentic AI system may include sensors for example as described herein (e.g., cameras, microphones, and other exemplary disclosed sensors of male accessory 308, female accessory 315, male user device 305 and/or female user device 310, including for example respective sensor array 306, imaging device 350, and/or any other suitable devices described herein). The agentic AI system may also include input channels for processing raw data obtained by system 300 and a data preprocessing module for preparing data for use by the exemplary disclosed engines. The agentic AI system may utilize algorithms for analyzing the obtained data for example as described herein. The agentic AI system may operate (e.g., using reinforcement learning or rule-based planning) to create a series of activities or actions for achieving a desired result. The agentic AI system may then organize stored data for use in reasoning and decision-making by the system. The agentic AI system may implement activities and results as physical actions (e.g., of the exemplary disclosed adult toys) and/or software commands (e.g., of the exemplary disclosed component described herein). The agentic AI system may utilize output channels such as the exemplary disclosed applications and/or control of the exemplary disclosed adult toys. The agentic AI system may also utilize feedback loops using the exemplary disclosed components to monitor and evaluate results of its actions and feedback (e.g., based on comments and actions of users using the exemplary disclosed devices including for example tipping and other user behavior). The agentic AI system may utilize any suitable machine learning operations such as supervised learning (e.g., involving labeling data and focusing on performance of specific tasks), reinforcement learning (e.g., involving rewards and penalties received on a trial and error basis), transfer learning (e.g., use of knowledge obtained on previous tasks for use on future tasks), and/or unsupervised learning (e.g., system 300 detecting relationships and patterns without the use of data labeling).

Figure 12:
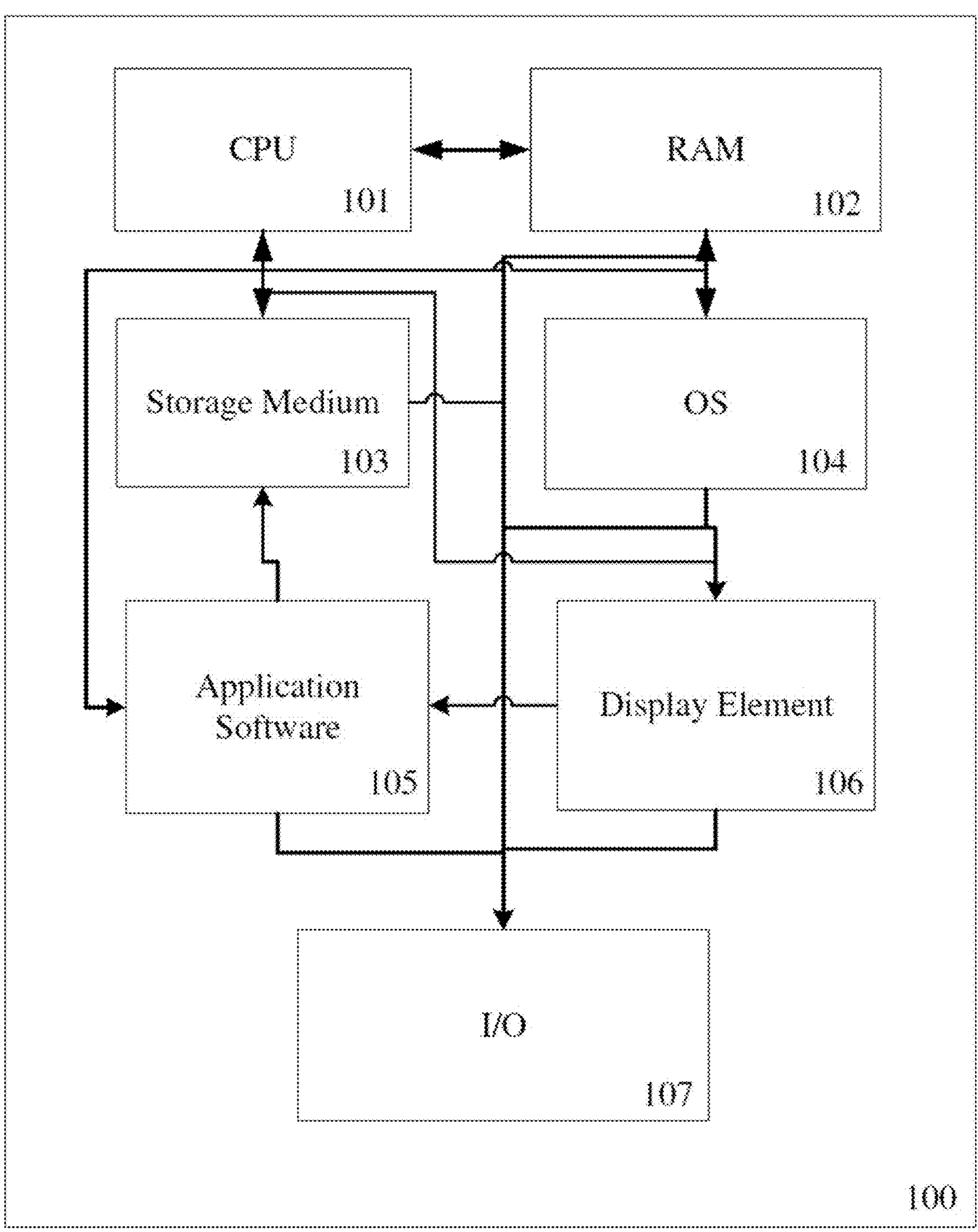
FIG. 12 is a schematic illustration of an exemplary computing device, in accordance with at least some exemplary embodiments of the present disclosure.

An illustrative representation of a computing device appropriate for use with embodiments of the system of the present disclosure is shown in FIG. 12. The computing device 100 can generally be comprised of a Central Processing Unit (CPU, 101), optional further processing units including a graphics processing unit (GPU), a Random Access Memory (RAM, 102), a mother board 103, or alternatively/additionally a storage medium (e.g., hard disk drive, solid state drive, flash memory, cloud storage), an operating system (OS, 104), one or more application software 105, a display element 106, and one or more input/output devices/means 107, including one or more communication interfaces (e.g., RS232, Ethernet, Wifi, Bluetooth, USB). Useful examples include, but are not limited to, personal computers, smart phones, laptops, mobile computing devices, tablet PCs, touch boards, and servers. Multiple computing devices can be operably linked to form a computer network in a manner as to distribute and share one or more resources, such as clustered computing devices and server banks/farms.

Various examples of such general-purpose multi-unit computer networks suitable for embodiments of the disclosure, their typical configuration and many standardized communication links are well known to one skilled in the art, as explained in more detail and illustrated by FIG. 13, which is discussed herein-below.

According to an exemplary embodiment of the present disclosure, data may be transferred to the system, stored by the system and/or transferred by the system to users of the system across local area networks (LANs) (e.g., office networks, home networks) or wide area networks (WANs) (e.g., the Internet). In accordance with the previous embodiment, the system may be comprised of numerous servers communicatively connected across one or more LANs and/or WANs. One of ordinary skill in the art would appreciate that there are numerous manners in which the system could be configured and embodiments of the present disclosure are contemplated for use with any configuration.

In general, the system and methods provided herein may be employed by a user of a computing device whether connected to a network or not. Similarly, some steps of the methods provided herein may be performed by components and modules of the system whether connected or not. While such components/modules are offline, and the data they generated will then be transmitted to the relevant other parts of the system once the offline component/module comes again online with the rest of the network (or a relevant part thereof). According to an embodiment of the present disclosure, some of the applications of the present disclosure may not be accessible when not connected to a network, however a user or a module/component of the system itself may be able to compose data offline from the remainder of the system that will be consumed by the system or its other components when the user/offline system component or module is later connected to the system network.

Figure 13:
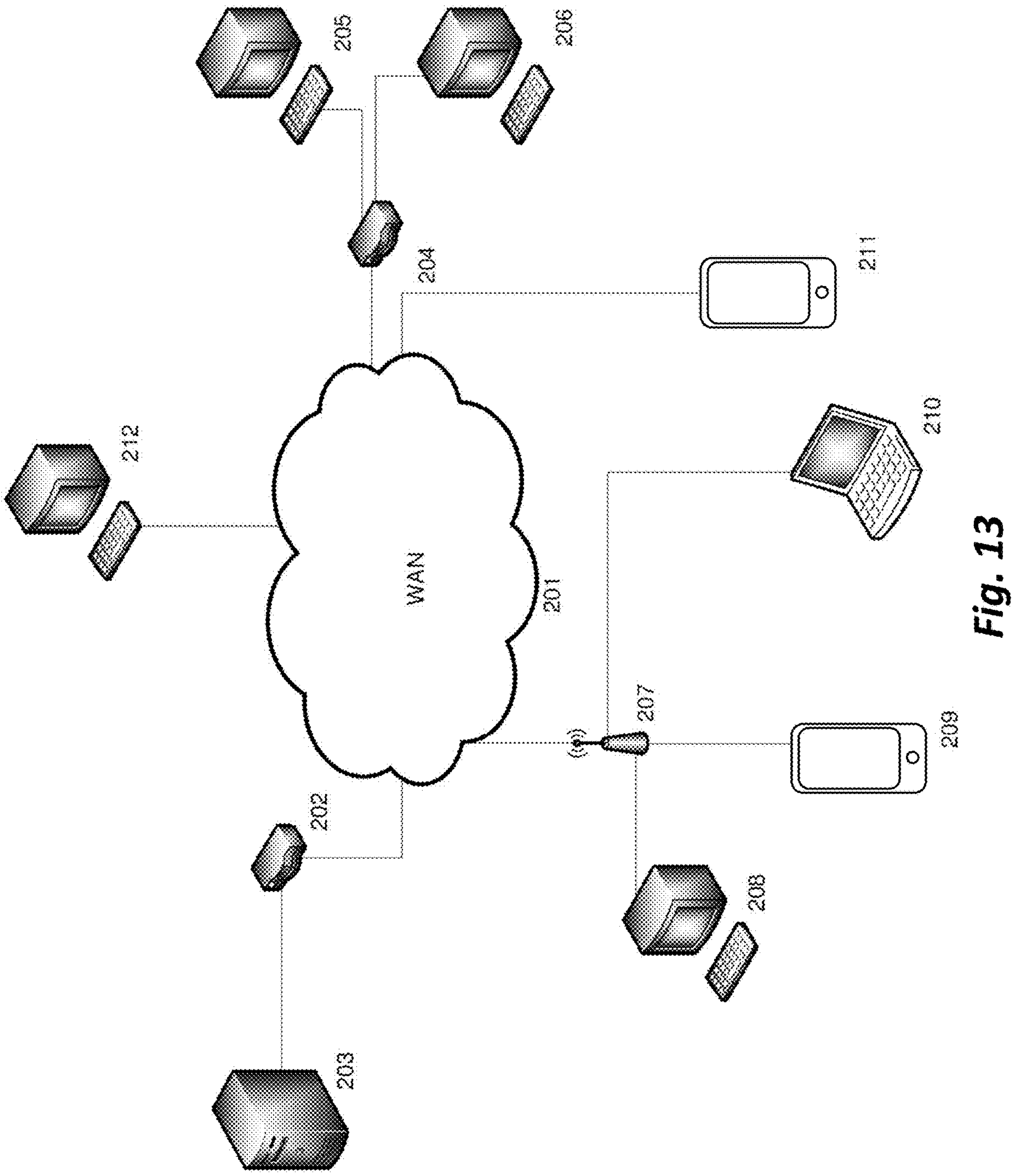
FIG. 13 is a schematic illustration of an exemplary network, in accordance with at least some exemplary embodiments of the present disclosure.

Referring to FIG. 13, a schematic overview of a system in accordance with an embodiment of the present disclosure is shown. The system is comprised of one or more application servers 203 for electronically storing information used by the system. Applications in the server 203 may retrieve and manipulate information in storage devices and exchange information through a WAN 201 (e.g., the Internet). Applications in server 203 may also be used to manipulate information stored remotely and process and analyze data stored remotely across a WAN 201 (e.g., the Internet).

According to an exemplary embodiment, as shown in FIG. 13, exchange of information through the WAN 201 or other network may occur through one or more high speed connections. In some cases, high speed connections may be over-the-air (OTA), passed through networked systems, directly connected to one or more WANs 201 or directed through one or more routers 202. Router(s) 202 are completely optional and other embodiments in accordance with the present disclosure may or may not utilize one or more routers 202. One of ordinary skill in the art would appreciate that there are numerous ways server 203 may connect to WAN 201 for the exchange of information, and embodiments of the present disclosure are contemplated for use with any method for connecting to networks for the purpose of exchanging information. Further, while this application refers to high speed connections, embodiments of the present disclosure may be utilized with connections of any speed.

Components or modules of the system may connect to server 203 via WAN 201 or other network in numerous ways. For instance, a component or module may connect to the system i) through a computing device 212 directly connected to the WAN 201, ii) through a computing device 205, 206 connected to the WAN 201 through a routing device 204, iii) through a computing device 208, 209, 210 connected to a wireless access point 207 or iv) through a computing device 211 via a wireless connection (e.g., CDMA, GMS, 3G, 4G) to the WAN 201. One of ordinary skill in the art will appreciate that there are numerous ways that a component or module may connect to server 203 via WAN 201 or other network, and embodiments of the present disclosure are contemplated for use with any method for connecting to server 203 via WAN 201 or other network. Furthermore, server 203 could be comprised of a personal computing device, such as a smartphone, acting as a host for other computing devices to connect to.

The communications means of the system may be any means for communicating data, including image and video, over one or more networks or to one or more peripheral devices attached to the system, or to a system module or component. Appropriate communications means may include, but are not limited to, wireless connections, wired connections, cellular connections, data port connections, Bluetooth® connections, near field communications (NFC) connections, or any combination thereof. One of ordinary skill in the art will appreciate that there are numerous communications means that may be utilized with embodiments of the present disclosure, and embodiments of the present disclosure are contemplated for use with any communications means.

Traditionally, a computer program includes a finite sequence of computational instructions or program instructions. It will be appreciated that a programmable apparatus or computing device can receive such a computer program and, by processing the computational instructions thereof, produce a technical effect.

A programmable apparatus or computing device includes one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this disclosure and elsewhere a computing device can include any and all suitable combinations of at least one general purpose computer, special-purpose computer, programmable data processing apparatus, processor, processor architecture, and so on. It will be understood that a computing device can include a computer-readable storage medium and that this medium may be internal or external, removable and replaceable, or fixed. It will also be understood that a computing device can include a Basic Input/Output System (BIOS), firmware, an operating system, a database, or the like that can include, interface with, or support the software and hardware described herein.

Embodiments of the system as described herein are not limited to applications involving conventional computer programs or programmable apparatuses that run them. It is contemplated, for example, that embodiments of the disclosure as claimed herein could include an optical computer, quantum computer, analog computer, or the like.

Regardless of the type of computer program or computing device involved, a computer program can be loaded onto a computing device to produce a particular machine that can perform any and all of the depicted functions. This particular machine that may be a networked configuration provides a technique for carrying out any and all of the depicted functions.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Illustrative examples of the computer readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A data store may be comprised of one or more of a database, file storage system, relational data storage system or any other data system or structure configured to store data. The data store may be a relational database, working in conjunction with a relational database management system (RDBMS) for receiving, processing and storing data. A data store may comprise one or more databases for storing information related to the processing of moving information and estimate information as well one or more databases configured for storage and retrieval of moving information and estimate information.

Computer program instructions can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

The elements depicted in flowchart illustrations and block diagrams throughout the figures imply logical boundaries between the elements. However, according to software or hardware engineering practices, the depicted elements and the functions thereof may be implemented as parts of a monolithic software structure, as standalone software components or modules, or as components or modules that employ external routines, code, services, and so forth, or any combination of these. All such implementations are within the scope of the present disclosure. In view of the foregoing, it will be appreciated that elements of the block diagrams and flowchart illustrations support combinations of means for performing the specified functions, combinations of steps for performing the specified functions, program instruction technique for performing the specified functions, and so on.

It will be appreciated that computer program instructions may include computer executable code. A variety of languages for expressing computer program instructions are possible, including without limitation C, C++, Java, JavaScript, assembly language, Lisp, HTML, Perl, and so on. Such languages may include assembly languages, hardware description languages, database programming languages, functional programming languages, imperative programming languages, and so on. In some embodiments, computer program instructions can be stored, compiled, or interpreted to run on a computing device, a programmable data processing apparatus, a heterogeneous combination of processors or processor architectures, and so on. Without limitation, embodiments of the system as described herein can take the form of web-based computer software, which includes client/server software, software-as-a-service, peer-to-peer software, or the like.

In some embodiments, a computing device enables execution of computer program instructions including multiple programs or threads. The multiple programs or threads may be processed more or less simultaneously to enhance utilization of the processor and to facilitate substantially simultaneous functions. By way of implementation, any and all methods, program codes, program instructions, and the like described herein may be implemented in one or more thread. The thread can spawn other threads, which can themselves have assigned priorities associated with them. In some embodiments, a computing device can process these threads based on priority or any other order based on instructions provided in the program code.

Unless explicitly stated or otherwise clear from the context, the verbs "process" and "execute" are used interchangeably to indicate execute, process, interpret, compile, assemble, link, load, any and all combinations of the foregoing, or the like. Therefore, embodiments that process computer program instructions, computer-executable code, or the like can suitably act upon the instructions or code in any and all of the ways just described.

The functions and operations presented herein are not inherently related to any particular computing device or other apparatus. Various general-purpose systems may also be used with programs in accordance with the teachings herein, or it may prove convenient to construct more specialized apparatus to perform the required method steps. The required structure for a variety of these systems will be apparent to those of ordinary skill in the art, along with equivalent variations. In addition, embodiments of the disclosure are not described with reference to any particular programming language. It is appreciated that a variety of programming languages may be used to implement the present teachings as described herein, and any references to specific languages are provided for disclosure of enablement and best mode of embodiments of the disclosure. Embodiments of the disclosure are well suited to a wide variety of computer network systems over numerous topologies. Within this field, the configuration and management of large networks include storage devices and computing devices that are communicatively coupled to dissimilar computing and storage devices over a network, such as the Internet, also referred to as "web" or "world wide web".

Throughout this disclosure and elsewhere, block diagrams and flowchart illustrations depict methods, apparatuses (e.g., systems), and computer program products. Each element of the block diagrams and flowchart illustrations, as well as each respective combination of elements in the block diagrams and flowchart illustrations, illustrates a function of the methods, apparatuses, and computer program products. Any and all such functions ("depicted functions") can be implemented by computer program instructions; by special-purpose, hardware-based computer systems; by combinations of special purpose hardware and computer instructions; by combinations of general purpose hardware and computer instructions; and so on-any and all of which may be generally referred to herein as a "component", "module," or "system."

While the foregoing drawings and description set forth functional aspects of the disclosed systems, no particular arrangement of software for implementing these functional aspects should be inferred from these descriptions unless explicitly stated or otherwise clear from the context.

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an embodiment can contain an alternate order of the steps adapted to a particular application of a technique disclosed herein. All such variations and modifications are intended to fall within the scope of this disclosure. The depiction and description of steps in any particular order is not intended to exclude embodiments having the steps in a different order, unless required by a particular application, explicitly stated, or otherwise clear from the context.

The functions, systems and methods herein described could be utilized and presented in a multitude of languages. Individual systems may be presented in one or more languages and the language may be changed with ease at any point in the process or methods described above. One of ordinary skill in the art would appreciate that there are numerous languages the system could be provided in, and embodiments of the present disclosure are contemplated for use with any language.

It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments.

It will be apparent to those skilled in the art that various modifications and variations can be made to the disclosed system and method. Other embodiments will be apparent to those skilled in the art from consideration of the specification and practice of the disclosed method and apparatus. It is intended that the specification and examples be considered as exemplary only, with a true scope being indicated by the following claims.

What is claimed is:

1. A method for interaction based on a livestreaming digital asset model, comprising:

activating a monitored object digital application for a user in response to a user input satisfying a specific activation condition, wherein the monitored object digital application is a user-oriented digital application deployed with the livestreaming digital asset model trained on collected data clusters;

acquiring, via the monitored object digital application, input information associated with the user;

extracting, via the monitored object digital application, information related to a monitored object from the input information;

determining, via the monitored object digital application, a digital asset associated with the monitored object; and providing, to the user via the monitored object digital application, interactive information including creator interaction data or audience feedback data associated with the digital asset of the monitored object.

2. The method of claim 1, wherein determining the digital asset associated with the monitored object includes:

matching, via the monitored object digital application, the digital asset of the monitored object from pre-established digital assets;

wherein the pre-established digital assets are configured to be generated by the livestreaming digital asset model based on training performed on the collected data clusters.

3. The method of claim 1, wherein determining the digital asset associated with the monitored object includes:

inputting, via the monitored object digital application, the information related to the monitored object into the livestreaming digital asset model; and processing, via the livestreaming digital asset model, the information related to the monitored object to generate the digital asset of the monitored object.

4. The method of claim 1, wherein the digital asset of the monitored object includes at least one of:

a designated creator digital asset associated with one or more designated creators;

a type digital asset associated with one or more designated types of creators; or a common digital asset formed from one or more common data elements associated with a plurality of creators.

5. The method of claim 1, wherein:

the creator interaction data associated with the digital asset of the monitored object includes at least one of motion characteristic data, voiceprint characteristic data, image characteristic data, or performance content segment data, which characterize one or more features of a creator; and the audience feedback data associated with the digital asset of the monitored object includes at least one of tipping operation data, comment operation data, toy control operation data, or viewing duration data, which characterize one or more features of an audience.

6. The method of claim 1, wherein providing the user with the interactive information including the creator interaction data or the audience feedback data associated with the digital asset of the monitored object includes:

determining a presentation format for the digital asset; and providing the user with the interactive information associated with the digital asset of the monitored object in the determined presentation format.

7. The method of claim 1, wherein the monitored object digital application that is the user-oriented digital application includes:

an audience digital application for audience end-users;

a creator digital application for creator end-users; or a general digital application for general end-users.

8. The method of claim 1, wherein activating the monitored object digital application for the user includes at least one of:

activating the monitored object digital application for a creator end-user prior to initiation of a livestreaming session of the creator end-user; or activating the monitored object digital application for the creator end-user during the livestreaming session; or activating the monitored object digital application for the creator end-user following termination of the livestreaming session.

9. The method of claim 8, wherein providing the user, via the monitored object digital application, with the interactive information including the creator interaction data or the audience feedback data associated with the digital asset of the monitored object includes:

via the monitored object digital application, during the livestreaming session of the creator end-user, in response to a livestreaming scenario of the creator end-user satisfying a predetermined condition, providing the creator end-user with the interactive information including the creator interaction data or the audience feedback data associated with the digital asset of the monitored object;

wherein the monitored object includes a specific creator or a specific group of creators; and wherein the interactive information includes behavioral data of the specific creator or the specific group of creators from a same or similar livestreaming scenario as that of the creator end-user.

10. The method of claim 8, wherein providing the user, via the monitored object digital application, with the interactive information including the creator interaction data or the audience feedback data associated with the digital asset of the monitored object includes:

via the monitored object digital application, during the livestreaming session of the creator end-user, in response to receiving audience interaction data from an audience member, providing the creator end-user with associated interactive information of the interactive information, the associated interactive information being configured to respond to the audience interaction data from the audience member on behalf of the creator end-user.

11. The method of claim 8, wherein providing the user, via the monitored object digital application, with the interactive information including the creator interaction data or the audience feedback data associated with the digital asset of the monitored object includes:

via the monitored object digital application, during the livestreaming session of the creator end-user, in response to a livestreaming scenario of the creator end-user satisfying a predetermined condition, providing the creator end-user with a recording and storage of the livestreaming scenario to preserve the interactive information including the creator interaction data or the audience feedback data associated with the creator end-user.

12. The method of claim 8, wherein providing the user, via the monitored object digital application, with the interactive information including the creator interaction data or the audience feedback data associated with the digital asset of the monitored object includes:

via the monitored object digital application, prior to or during the livestreaming session of the creator end-user, providing the creator end-user with the interactive information including the creator interaction data or the audience feedback data associated with the digital asset of the monitored object;

wherein the monitored object includes a specific creator or a specific group of creators; and wherein the interactive information includes performance content information of the specific creator or the specific group of creators.

13. The method of claim 1, wherein activating the monitored object digital application for the user includes:

activating the monitored object digital application including an interactive entity for a general end-user, the interactive entity being associated with the monitored object, and the monitored object digital application being configured to:

present, to the general end-user, the creator interaction data associated with the digital asset of the monitored object to render a digital representation of the monitored object; or in response to an interactive operation performed by the general end-user with the interactive entity, present, to the general end-user, the creator interaction data associated with the digital asset of the monitored object to render at least one of motion characteristic data, voiceprint characteristic data, image characteristic data, or performance content data of the monitored object.

14. The method of claim 1, wherein activating the monitored object digital application for the user includes:

activating, at a terminal of an audience end-user, the monitored object digital application for the audience end-user, the monitored object digital application including a message notification function, and the monitored object including a specific creator;

wherein the monitored object digital application is configured to:

in response to detecting that a current livestream data of the specific creator meets a predetermined expectation of the audience end-user, output to the audience end-user a message notification indicating that at least one of the creator interaction data or the audience feedback data associated with the digital asset of the specific creator satisfies the predetermined expectation of the audience end-user.

15. The method of claim 14, further comprising in response to an operation performed by the audience end-user on the interactive information, causing the terminal of the audience end-user to redirect a current viewing page to a livestream page of the specific creator associated with the interactive information.

16. The method of claim 1, wherein the livestreaming digital asset model is deployed by the monitored object digital application through:

monitoring and collecting the collected data clusters associated with a creator, the collected data clusters including the creator interaction data and the audience feedback data from historical livestreaming sessions, personal data of the creator, and personal data of audience members;

parsing the creator interaction data, the personal data of the creator, and the personal data of the audience members into content parameters;

parsing the audience feedback data into control parameters;

extracting numerical features from the content parameters and the control parameters, and training a preset model therewith to obtain a trained livestreaming digital asset model, wherein the trained livestreaming digital asset model includes feature digital assets characterizing features of the creator and features of the audience members; and encapsulating the trained livestreaming digital asset model and deploying it to the user-oriented monitored object digital application.

17. A system, comprising:

at least one module comprising computer-executable code stored in non-volatile memory; and a memory for storing instructions and a processor for executing the instructions;

wherein the computer-executable code, when operating on the processor, causes the system to:

activate a monitored object digital application for a user in response to a user input satisfying a specific activation condition, wherein the monitored object digital application is a user-oriented digital application deployed with a livestreaming digital asset model trained on collected data clusters;

acquire, via the monitored object digital application, input information associated with the user;

extract, via the monitored object digital application, information related to a monitored object from the input information;

determine, via the monitored object digital application, a digital asset associated with the monitored object; and provide, to the user via the monitored object digital application, interactive information including creator interaction data or audience feedback data associated with the digital asset of the monitored object.

18. The system of claim 17, wherein activating the monitored object digital application for the user includes at least one of:

activating the monitored object digital application for a creator end-user prior to initiation of a livestreaming session of the creator end-user;

activating the monitored object digital application for the creator end-user during the livestreaming session; or activating the monitored object digital application for the creator end-user following termination of the livestreaming session.

19. A non-transitory computer-readable storage medium, comprising:

machine-readable instructions, wherein the machine-readable instructions, when executed by a processor of a controller, cause the controller to:

activate a monitored object digital application for a user in response to a user input satisfying a specific activation condition, wherein the monitored object digital application is a user-oriented digital application deployed with a livestreaming digital asset model trained on collected data clusters;

acquire, via the monitored object digital application, input information associated with the user;

extract, via the monitored object digital application, information related to a monitored object from the input information;

determine, via the monitored object digital application, a digital asset associated with the monitored object; and provide, to the user via the monitored object digital application, interactive information including creator interaction data or audience feedback data associated with the digital asset of the monitored object.

20. The non-transitory computer-readable storage medium of claim 19, wherein activating the monitored object digital application for the user includes at least one of:

activating the monitored object digital application for a creator end-user prior to initiation of a livestreaming session of the creator end-user;

activating the monitored object digital application for the creator end-user during the livestreaming session; or activating the monitored object digital application for the creator end-user following termination of the livestreaming session.

* * * * *